US009271893B2

(12) United States Patent
Knopow et al.

(10) Patent No.: US 9,271,893 B2
(45) Date of Patent: Mar. 1, 2016

(54) MONOCOQUE AMBULATION AID

(71) Applicant: Motivo, Inc., Franklin, WI (US)

(72) Inventors: Jeremy F. Knopow, Burlington, WI (US); Jennifer R. Harris, Milwaukee, WI (US)

(73) Assignee: MOTIVO, INC., Franklin, WI (US)

( * ) Notice: Subject to any disclaimer, the term of this patent is extended or adjusted under 35 U.S.C. 154(b) by 252 days.

(21) Appl. No.: 13/951,117

(22) Filed: Jul. 25, 2013

(65) Prior Publication Data

US 2014/0031176 A1 Jan. 30, 2014

Related U.S. Application Data

(60) Provisional application No. 61/675,343, filed on Jul. 25, 2012.

(51) Int. Cl.
*B62B 1/12* (2006.01)
*A61H 3/04* (2006.01)
*A61H 3/00* (2006.01)

(52) U.S. Cl.
CPC .. *A61H 3/04* (2013.01); *A61H 3/00* (2013.01); *A61H 2003/002* (2013.01); *A61H 2003/004* (2013.01); *A61H 2003/046* (2013.01); *A61H 2201/0107* (2013.01); *A61H 2201/0161* (2013.01); *A61H 2201/0192* (2013.01); *A61H 2201/1633* (2013.01)

(58) Field of Classification Search
CPC ............................ B62B 2202/404; B62B 3/02
USPC ....................................... 280/639, 646, 47.34
See application file for complete search history.

(56) References Cited

U.S. PATENT DOCUMENTS 268,238 A 11/1882 Johnson
320,462 A 6/1885 Cowing (Continued)

FOREIGN PATENT DOCUMENTS

EP 1690977 A2 8/2006

OTHER PUBLICATIONS

International Searching Authority, "Search Report", issued in connection with International Patent application No. PCT/US2013/052082, mailed on Oct. 30, 2013, 5 Pages.

(Continued)

*Primary Examiner* — John Walters
*Assistant Examiner* — James Triggs
(74) *Attorney, Agent, or Firm* — Hanley, Flight and Zimmerman, LLC

(57) ABSTRACT

Example ambulation aid apparatus and associated methods of manufacture are disclosed and described herein. An example ambulation aid apparatus includes an ambulation aid body formed as a integral part, the integral part formed in monocoque construction to provide support for mobility of a user through the integral part, the integral part providing a plurality of grippable areas to facilitate user movement and support through the integral part. Another example ambulation aid apparatus includes a primary panel formed in monocoque construction to provide support for and assist in mobility of a user through the skin of the monocoque primary panel, the primary panel formed to interrelate with one or more subassemblies to provide an integrated monocoque part to assist in providing support for and improved mobility of the user through the integrated monocoque part. Example methods of manufacture are also disclosed and described.

37 Claims, 35 Drawing Sheets

(56) References Cited

U.S. PATENT DOCUMENTS

| | | | | |
|---|---|---|---|---|
| 673,100 | A | 4/1901 | Tyler | |
| 1,394,224 | A | 10/1921 | Scott | |
| 1,448,783 | A | 3/1923 | Blewitt et al. | |
| 1,802,323 | A | 4/1931 | Aulmann | |
| 2,278,901 | A | 4/1942 | Smock | |
| 2,305,249 | A | 12/1942 | Frost | |
| 2,437,778 | A | 3/1948 | Ames | |
| 2,667,914 | A | 2/1954 | Forbes | |
| 2,745,465 | A | 5/1956 | Hogan | |
| 2,796,916 | A | 6/1957 | Womble | |
| 2,808,305 | A * | 10/1957 | Jackson | 312/140.2 |
| 2,817,387 | A | 12/1957 | Blake | |
| 4,029,311 | A | 6/1977 | Chanslor et al. | |
| 4,415,198 | A * | 11/1983 | Brearley | 297/6 |
| 5,028,065 | A | 7/1991 | Danecker | |
| 5,529,425 | A | 6/1996 | Spies et al. | |
| 5,692,762 | A | 12/1997 | Obitts | |
| D397,644 | S | 9/1998 | Douglass | |
| 6,004,218 | A * | 12/1999 | Keating et al. | 472/94 |
| 6,014,981 | A | 1/2000 | Douglass | |
| D446,973 | S * | 8/2001 | Henry et al. | D6/653 |
| 6,883,529 | B2 * | 4/2005 | Kvaternik | 135/66 |
| 7,040,637 | B2 | 5/2006 | Owens et al. | |
| 7,108,004 | B2 | 9/2006 | Cowie et al. | |
| 7,157,034 | B2 | 1/2007 | Bristow et al. | |
| 7,198,284 | B2 | 4/2007 | Cerreto et al. | |
| 7,559,560 | B2 | 7/2009 | Li et al. | |
| 7,866,677 | B1 * | 1/2011 | Rothstein et al. | 280/47.34 |
| 8,113,604 | B2 * | 2/2012 | Olson et al. | 312/236 |
| 8,434,780 | B2 | 5/2013 | Li | |
| 2004/0084870 | A1 | 5/2004 | Ward et al. | |
| 2008/0185797 | A1 | 8/2008 | Bohn | |

OTHER PUBLICATIONS

International Searching Authority, "Written opinion", issued in connection with International Patent application No. PCT/US2013/052082, mailed on Oct. 30, 2013, 7 Pages.

International Bureau, International Preliminary Report on Patentability, issued in connection with PCT patent application No. PCT/US2013/052082, issued on Jan. 27, 2015, 8 pages.

Invacare Corporation, "Personal Care Products", 2001, 32 Pages.

Scooterville,"Runabout Folding Rollator (SC808)" retrieved from the internet:<http://www.scooterville.com/Scooterville_Runabout_Folding_Rollator_%28SC808%29/p/41726/c/669/>, last visited Jul. 29, 2013, 2 pages.

Eurovema, "Volaris 1422150 S7 Rollator", retrieved from the internet:<http://www.volaris.se/default.asp?M=100000002&L=EN>, last visited Jul. 29, 2013, 1 page.

Breeze by Access, "Breeze", retrieved from the internet:<http://www.breeze-walker.com/>, last visited Jul. 29, 2013, 2 page.

Active by Access,"Active", retrieved from the internet:<http://www.active-walker.com/usa/home>, last visited Jul. 29, 2013, 1 page.

Invacare Corporation, "Dolomite" retrieved from the internet:<http://www.dolomite.biz/>, last visited Jul. 29, 2013, 1 page.

* cited by examiner (c)

MONOCOQUE AMBULATION AID

CROSS-REFERENCE TO RELATED APPLICATIONS

The present application claims the benefit of priority to U.S. Provisional Patent Application No. 61/675,343, filed on Jul. 25, 2012, entitled "HOLLOW MOLDED POLYMER AMBULATION AID", which is herein incorporated by reference in its entirety.

FIELD

The present field of invention relates to ambulation aids, and more specifically to an ambulation aid formed in monocoque, semi-monocoque, or other integral construction.

BACKGROUND

A range of ambulation aids have been developed over the many years since these devices were first introduced. These devices are used to assist people in the act of walking or standing by providing weight bearing and/or balance assistance. Historically, the basic construction method has changed little, with the vast majority being constructed of extruded metal tubing. A smaller percentage of devices have been constructed of assembled polyvinyl chloride (PVC) plumbing pipe, hydroformed metal, or occasionally injection molded polymer parts.

In either case, multiple pieces (e.g., multiple tubes) must be assembled to create a frame on which one or more supports can be provided to aid in user mobility. Such tubular frame-based assemblies are complex to manufacture and assemble and suffer from multiple joinders and other contact points. Additionally, the tubular frame creates an undesirable aesthetic. Further, an excessive amount of time and multiple processes may be required in assembly.

Current construction techniques only offer a limited range of engineering and design flexibility. This is due to the nature of the materials used, as well their method of manufacturing and construction. Designs based on tubular materials are limited by factors such as the availability of stock materials, bend radii of the tubes, how the tubes are joined at intersections, weight of the tubes, strength of the tubes, the overall shape and form of the cylindrical materials, etc. Hydroformed metal construction allows for more design flexibility than tubular materials, but the nature of the hydroforming process and the materials used are expensive and can quickly place the ambulation aid out of the price range of most users. Injection molded polymer construction can offer yet more design flexibility than hydroformed metal, but the geometry required to make the parts strong enough for use result in an overly heavy part. In addition to the weight disadvantage, all of the structural ribbing required to make an injection molded solid polymer part strong enough for use results in a part that is generally unattractive on at least one side, while all of the cracks and crevices also make it difficult to clean.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings and photos accompanying and forming a part of this specification, wherein like reference numerals designate the same elements in the several views, and in which.

DETAILED DESCRIPTION OF CERTAIN EMBODIMENTS

Overview and Brief Description

Figure 1:
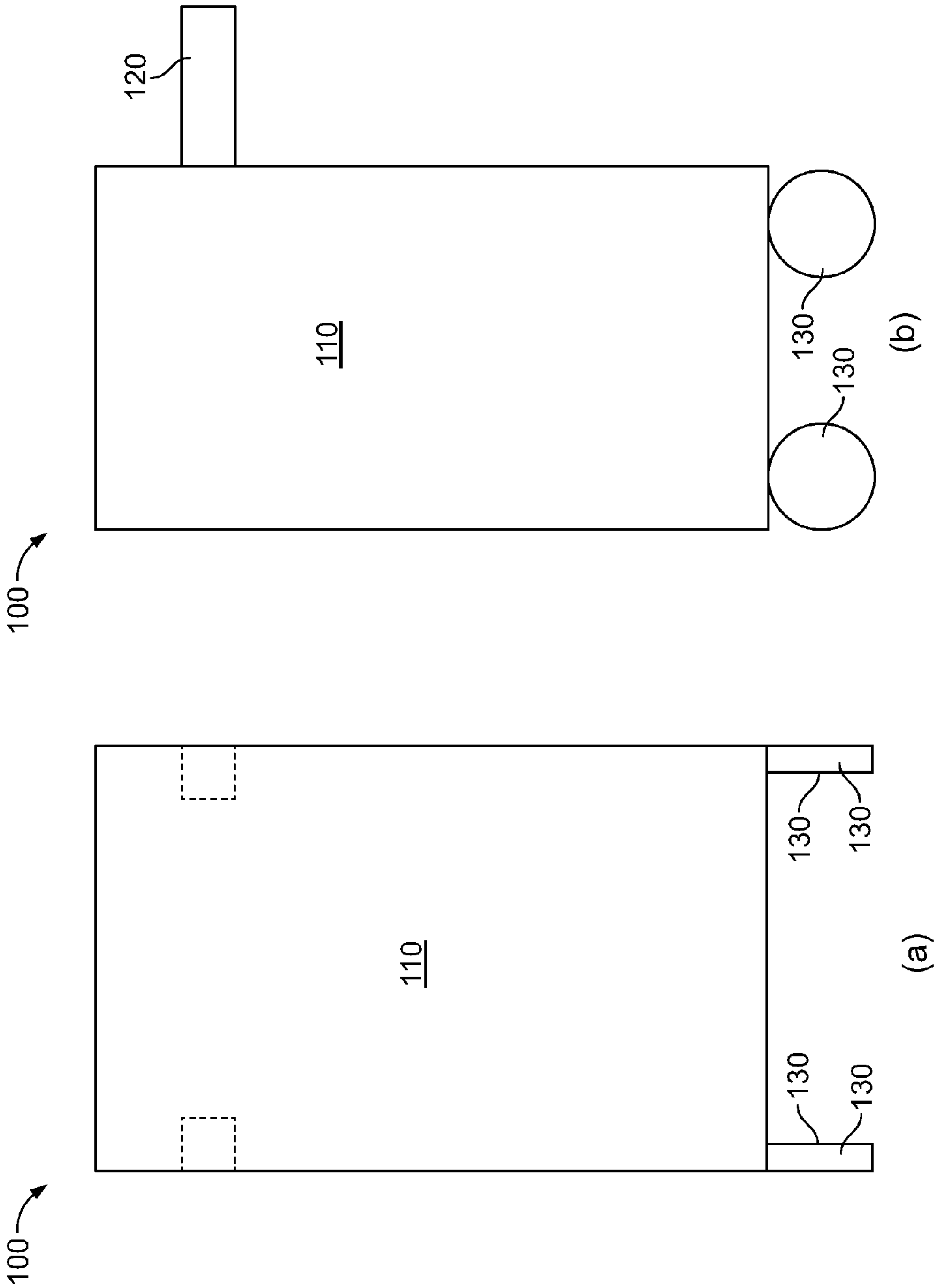
FIGS. 1*a-g* illustrate views and variations of an example ambulation aid.
Figure 1:
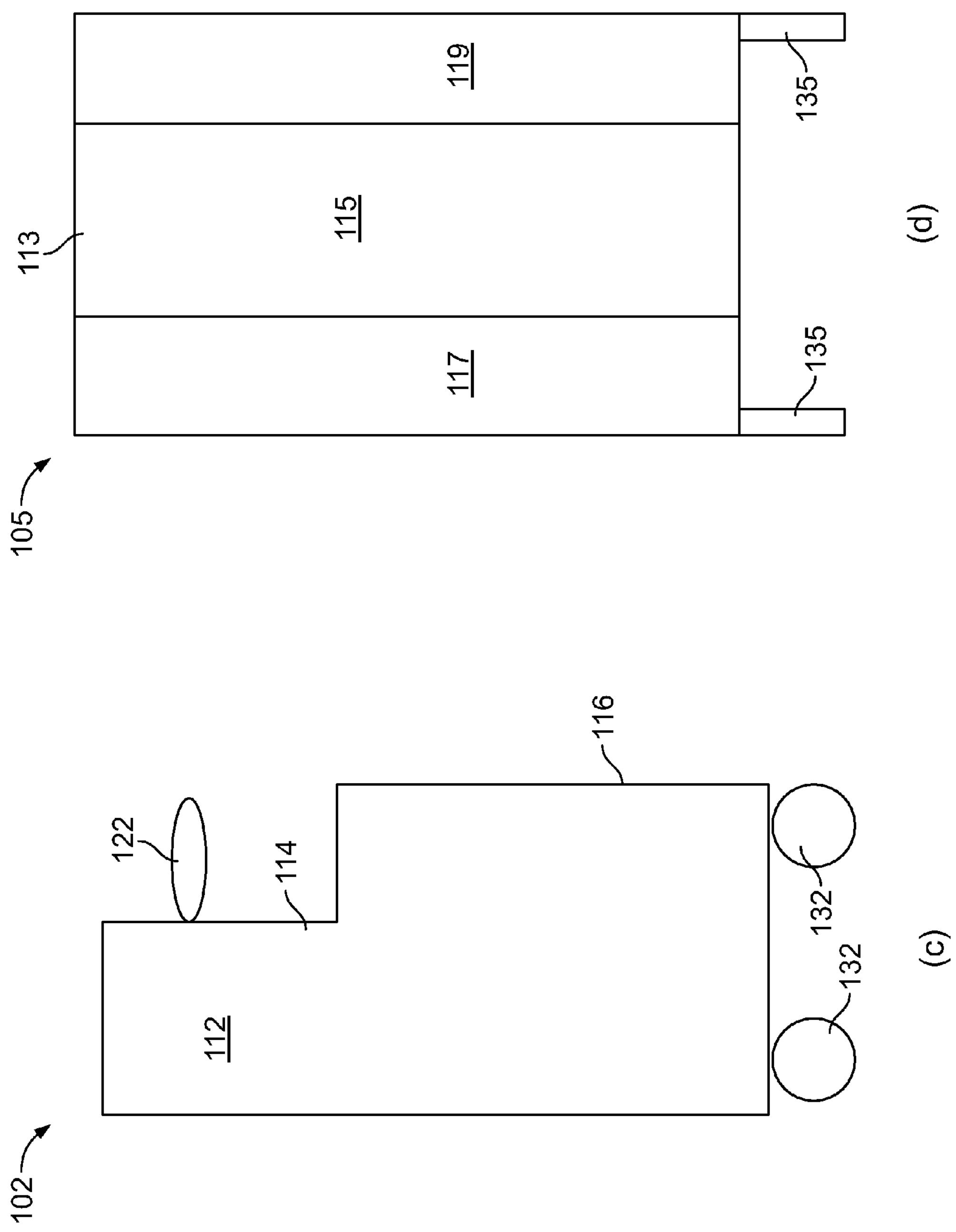
Figure 1:
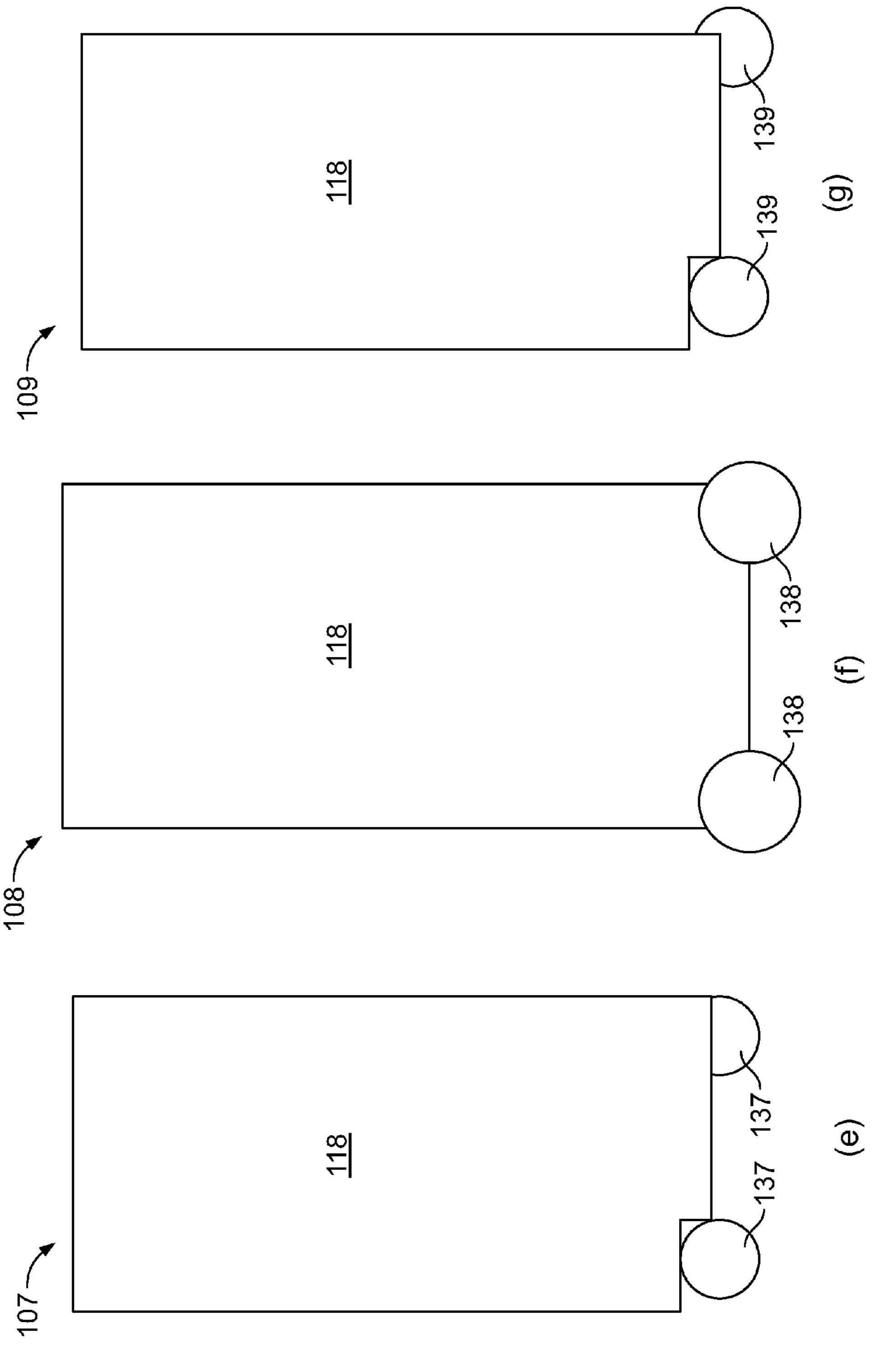

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "connected," "including," and "comprising" and variations thereof in the description and the claims is meant to encompass the items listed thereafter and equivalents thereof as well as additional items and equivalents thereof.

Certain examples described and disclosed herein relate to ambulation aids, and more specifically to ambulation aids formed in unibody, unitary, monocoque, and/or semi-monocoque construction for simplified manufacture, durable construction, and user support, as well as more pleasing aesthetics and increased design options. For example, an ambulation aid can be constructed to be primarily hollow and made of a molded polymer material, allowing for a lightweight, yet strong, customizable, and economically viable solution. The inventive structure also allows for integrated accommodations such as personal storage, seating, height adjustment, walking cane storage, cup holder, tray, and/or the like to be integrated into and/or otherwise attached to the structure.

In certain examples, an ambulation aid apparatus is formed to unify a plurality of structural and/or ornamental features into a single integral part. For example, a body of the example ambulation aid apparatus may serve as a protective shell with integrated support frame while also providing a cosmetic exterior for the ambulation aid. Thus, the ambulation aid body provides structural strength and support while also providing a cosmetic exterior and/or interior for the apparatus in a single integral part (e.g., using monocoque construction). The body of the example ambulation aid may also provide integrated mounting and/or attachment point(s) to attach one or more components/subassemblies to the body.

Certain examples provide an ambulation or mobility aid (often referred to as a "rollator" or "walker") constructed to allow for a wide range of design and engineering flexibility, while remaining lightweight, strong, and affordable. Rather than providing a development or training aid for a user to learn mobility for the first time as part of normal human development (e.g., a baby), certain examples provide a medical assistance rollator, walker, and/or other mobility aid for a user who knows how to walk but has difficulty with unassisted mobility.

Certain examples provide a unibody or monocoque design to lend simplicity, stability, and improved support to the ambulation aid. A unibody or monocoque design is a structural approach that supports loads through the ambulation aid's shell or skin, which provides a combined body and frame in a single structure (rather than a tubular frame constructed from a plurality of separate but connected tubes and including additional attachments). In certain examples, a monocoque or unibody ambulation aid provides a structural skin or shell designed to bear weight from a user relying on the ambulation aid for movement, stability, and/or other support.

In monocoque construction, for example, a skin or surface is the supporting structure for the ambulation aid. All or most of the load on the aid is taken by the surface or skin. Semi-monocoque construction is a hybrid structure in which a surface, skin, or shell is reinforced with rings, ribs, or frames to help carry the stress of a load, for example. In unibody construction, for example, a body is combined with a frame to provide supporting structure for the ambulation aid. In body on frame construction, for example, a skin is wrapped around a structural frame to provide supporting structure for the ambulation aid. In certain examples, one or more of monocoque, unibody, and body-on-frame construction can be combined to create a hybrid ambulatory aid apparatus.

In certain examples, an integral body of an example ambulation aid can be formed from one or more slabs or sheets of material. For example, the integral body can be formed from one or more sheets of a polymer material. Surface(s) of the integral body can be molded, machined, and/or otherwise formed via a thermoforming, extrusion, and/or other process, for example. As used herein, the terms sheet, slab, and core may be used interchangeably.

In certain examples, an external contour of an integral body of an example ambulation aid can embody an outward and interior physical appearance of the ambulation aid. That is, the integral body can include various ornamental features that improve an aesthetic appearance of the ambulation aid in both open and closed positions, for example.

In certain examples, the ambulation aid allows a user to store personal items, sit down when necessary or desired, carry a plate of food or other items on a flat surface, etc. The example ambulation aid adjusts to a user's height and provides for the storage of a secondary walking aid such as a cane, cup, purse or other bag, etc. The inventive structure also allows for accommodations such as personal storage, seating, height adjustment, walking cane storage, and a tray to be integrated into the structure.

Certain examples provide an apparatus including an ambulation aid body formed as a integral part, the integral part formed in monocoque construction to provide support for mobility of a user through the integral part, the integral part providing a plurality of grippable areas to facilitate user movement and support through the integral part.

In some examples, the ambulation aid body is to be formed as an integral part via a thermoforming process. In some examples, the ambulation aid body includes a reinforced, hollow integral part. In some examples, the ambulation aid body is to be formed from a polymer material. In some examples, the apparatus includes a seat to support a user when in use and to allow the user to walk inside a boundary of the ambulation aid body for support and movement via the ambulation aid body at least when the seat is not in use. In some examples, the apparatus includes a tray to support an item when in use and to allow the user to walk inside a boundary of the ambulation aid body for support and movement via the ambulation aid body at least when the tray is not in use.

In some examples, the plurality of grippable areas include one or more of a handle, an opening, a top of the ambulation aid body, a side of the ambulation aid body. In some examples, the handle is at least one of movably affixed to and incorporated into the ambulation aid body. In some examples, the handle is to be movable with respect to the ambulation aid body to adjust a height of the ambulation aid body with respect to the user.

In some examples, the apparatus includes at least one of a wheel and a skid affixed to the ambulation aid body to facilitate movement of the ambulation aid body by the user. In some examples, the ambulation aid body includes one or more connections between sections of the monocoque constructed integral body to enable the ambulation aid body to be folded, and wherein, when folded, the ambulation aid body is to remain self-standing and movable. In some examples, the ambulation aid body further includes storage, wherein the storage is to retain an item placed in the storage when the ambulation aid body is folded.

Certain examples provide a method of forming a monocoque ambulation aid. The example method includes forming, from a supply of moldable material, an ambulation aid body as an integral part in monocoque construction, the ambulation aid body formed in monocoque construction to provide support for mobility of a user through the integral part, the integral part providing a plurality of grippable areas to facilitate user movement and support through the integral part.

In some examples, forming includes forming, from a supply of moldable material using a thermoforming process, an ambulation aid body. In some examples, the thermoforming process includes a twin sheet thermoforming process. In some examples, forming includes forming, from a supply of moldable material using a blow molding process, an ambulation aid body. In some examples, forming further includes reinforcing the ambulation aid body to produce a reinforced, hollow integral part. In some examples, the supply of moldable material includes a polymer-based material.

In some examples, the method further includes attaching one or more subassemblies to the formed ambulation aid body. In some examples, the one or more subassemblies include a seat to support a user when in use and to allow the user to walk inside a boundary of the ambulation aid body for support and movement via the ambulation aid body at least when the seat is not in use. In some examples, the one or more subassemblies include a tray to support an item when in use and to allow the user to walk inside a boundary of the ambulation aid body for support and movement via the ambulation aid body at least when the tray is not in use. In some examples, the one or more subassemblies include at least one of wheels and a skid affixed to the ambulation aid body to facilitate movement of the ambulation aid body by the user. In some examples, the one or more subassemblies include storage, wherein the storage is to retain an item placed in the storage when the ambulation aid body is folded.

In some examples, the plurality of grippable areas include one or more of a handle, an opening, a top of the ambulation aid body, a side of the ambulation aid body. In some examples, the handle is at least one of movably affixed to and incorporated into the ambulation aid body. In some examples, the handle is to be movable with respect to the ambulation aid body to adjust a height of the ambulation aid body with respect to the user.

In some examples, the ambulation aid body includes one or more connectors to enable the ambulation aid body to be folded, and wherein, when folded, the ambulation aid body is to remain self-standing and movable.

Certain examples provide an ambulation aid apparatus. The example ambulation aid apparatus includes a primary panel formed in monocoque construction to provide support for and assist in mobility of a user through the skin of the monocoque primary panel, the primary panel formed to interrelate with one or more subassemblies to provide an integrated monocoque part to assist in providing support for and improved mobility of the user through the integrated monocoque part.

In some examples, the one or more subassemblies include a plurality of secondary monocoque panels, the plurality of secondary panels movably connected to the primary panel to form a body of the ambulatory aid and arranged to provide support and mobility to a user when the secondary panels are extended in relation to the primary panel. In some examples, connections between the primary panel and the plurality of secondary panels enable the ambulation aid apparatus to be folded, and wherein, when folded, the ambulation aid apparatus is to remain self-standing and movable.

In some examples, the one or more subassemblies include storage, wherein the storage is to retain an item placed in the storage when the ambulation aid apparatus is folded.

In some examples, the primary panel is to be formed via a thermoforming process. In some examples, the primary panel includes a reinforced, hollow monocoque part.

In some examples, the one or more subassemblies include a seat, wherein the user is able to walk inside a boundary of the ambulation aid apparatus for support and movement via the ambulation aid apparatus at least when the seat is not in use. In some examples, the one or more subassemblies include a tray, wherein the user is able to walk inside a boundary of the ambulation aid apparatus for support and movement via the ambulation aid apparatus at least when the tray is not in use.

In some examples, the one or more subassemblies include one or more grippable areas including one or more of a handle and an opening with respect to the ambulation aid apparatus. In some examples, the one or more subassemblies include at least one of a wheel and a skid affixed to the ambulation aid apparatus to facilitate movement of the ambulation aid apparatus by the user.

Example Ambulation Aids

FIGS. 1*a*-*b* illustrate an example ambulation aid 100. FIG. 1*a* shows a front view of the example ambulation aid 100 including a body panel 110 and wheels 130. FIG. 1*b* shows a side view of the example ambulation aid 100 including the body panel 110 and wheels 130 and further configured to include handles 120 and wheels 130.

The body 110 of the example ambulation aid 100 shown in FIGS. 1*a*-*b* can be manufactured from a molded material such as a hollow polymer formed in unibody or monocoque construction to provide a lightweight, yet strong, and customizable support for a user, such as an elderly user, rehabbing patient, disabled user, obese user, etc. The body 110 can be formed by a variety of manufacturing processes including a twin sheet thermoforming process. In certain examples, the body 110 can include and/or be formed from material including transparent, translucent, antimicrobial, bullet resistant, and/or other material. The body 110 can be provided with one or more customizable finishes (e.g., laminate, co-extruded laminate, paint, plating, texturing, applied graphics, embedded color/finish in base material, etc.), for example.

In certain examples, the body 110 serves as an enclosure, frame, support, and cosmetic exterior for the ambulation aid 100 to provide a rigid structure to the aid 100. In some examples, the body 110 may include openings, compartments, attachment points, interlocking configurations, etc., to facilitate incorporation and/or other attachment of accessories, components, and/or other subassemblies with and/or into the body 110. Depending upon size and configuration, one or more accessories/components/subassemblies can be formed as part of the body 110, separate from and attached to the body 110, and/or provided by a third party and accommodated by forming openings and/or other attachment points in the body 110, for example.

The body 110 and associated components are formed from one or more selected materials. Material selected to form the body 110 and/or other component(s) may be selected based on one or more factors including strength (e.g., tensile strength), density (e.g., lightweight), strength to weight ratio, Young's modulus, weather resistance, antimicrobial properties, cleaning ability, bullet resistance, formability, finishing, recyclability, tooling costs, design flexibility, manufacturing cost, reproducibility, etc. Material selection may also depend on and/or be influenced by aesthetics including color, transparency, translucency, durometer, surface finish, etc.

In certain examples, the body 110 is formed as a single integral part. For example, the body 110 is formed as a single, complete unit. By being integrally formed, the body 110 is structurally stronger than conventional multi-part constructed frames (e.g., traditional mechanical walker or rollator tubular frames that include parts that are fastened together). Further, unlike conventional devices that include seams between component parts, the example body 110 has a substantially seamless appearance. Construction of a mobility aid from substantially fewer parts provides benefits for a stable feel and manufacturing efficiency (e.g., faster throughput due to less assembly, fewer hand touches, etc.), for example. Fewer connected parts and less play in their connections results in less rattling and a more secure/stable body 110, for example. Additionally, by forming the body 110 as a single integral part, weather resistance, water resistance, recyclability, etc., is improved.

In certain examples, the body 110 provides support to a user while lending strength and stability to the user via the body 110 as well as to connected components such as handles 120, wheels 130, tray, seat, storage, etc. Further, the body 110 provides an aesthetically pleasing look by forming part of an ornamental appearance of the ambulation aid 100.

The handles 120 provide support to a user, and the wheels 130 provide mobility (e.g., as a rollator). In certain examples, a movable portion can be provided with respect to the body

110. The movable portion can include space for a tray, seat, and/or other accessory to be stored in, on, or otherwise with respect to the body 110 and positioned (e.g., pulled down, pulled out, pulled up, etc.) for use by a user. For example, the tray and/or seat can be foldable to extend for use and move away (e.g., fold against the body 110, slide into a storage cavity in the body 110, etc.) from the user when not in use, for example.

In certain examples, rather than protruding handles 120, one or more openings in the body panel 110 and/or other grips on or in the body panel 110 can be provided. In certain examples, rather than wheel 130, skids, skis, treads, etc., can be provided to help facilitate movement of the body panel 110.

In certain examples (such as an example ambulation aid 102 shown in FIG. 1*c*), a body 112 of the example ambulation aid 102 can include an upper portion 114 and a lower portion 116, where the upper portion 114 is recessed with respect to the lower portion 116 of the body 112, for example. The upper portion 114 and/or lower portion 116 (and/or at a juncture of the upper portion 114 and lower portion 116) can include a tray, seat, and/or other accessory component, movable with respect to the rest of the body 112, for example. As shown in the example of FIG. 1*c*, the ambulation aid 102 also includes one or more handles 122 for support and wheels 132 for mobility.

In certain examples (such as an example ambulation aid 105 shown in FIG. 1*d*), a body 113 of the example ambulation aid 105 can include a plurality of panels 115, 117, 119 joined via hinge and/or other movable connection, for example. The plurality of panels/panel segments 115, 117, 119 provide a stable, supportive body 113 when opened but can also close or fold together for storage, transportation, temporary stowage (e.g., when eating at a restaurant, watching a movie, attending a sporting event, and so on), etc. As shown in the example of FIG. 1*d*, the ambulation aid 105 also includes one or more handles 125 for support and wheels 135 for mobility.

As demonstrated in FIG. 1*d*, the body 113 of the ambulation aid 105 can be folded to occupy less space for storage, transport, etc. In some examples, the body 113 includes a plurality of segments, sections, or panels joined by a hinge, such as a piano or continuous hinge, living hinge, barrel hinge, mortised hinge, strap hinge, h-hinge, etc. For example, a single living hinge may be formed when two segments of the body 113 (right side and left side) are formed together as a single part with a thinner, flexible hinge or bearing created in the material at manufacture. Two living hinges are formed when three segments of the body 113 (middle, right side, and left side) are formed together as a single part, for example.

In certain examples, the hinge can be molded into the body 113 or the hinge can be molded from the body 113, rather than being a separate component. For example, a hinge can be formed by creating knuckles into the twin sheets used in thermoforming the body 113, which then may be trimmed and/or drilled if necessary and/or desired. A pin can then be dropped or otherwise placed between the knuckles to join the knuckles into a working hinge. In some examples, a hinge can be formed using blow molding, rotational molding, gas assist injection, molding, injection molding, etc., rather than thermoforming. If molding (e.g., injection molding, blow molding, rotational molding, etc.) is used instead of thermoforming, then two hinge parts can be molded in the body 113 which then interlock to form the hinge. In certain examples, a separate mechanical or living hinge can be placed into the mold during any of these processes and incorporated during the molding process.

When folded, the ambulation aid 105 remains self-standing, rather than having to be leaned against something else for support. The aid 105 can also be rolled and/or otherwise moved while remaining self-standing when folded. Using monocoque construction, the ambulation aid 105 can be kept at a light weight to aid in lifting, transport, and/or other movement.

As shown in the example of FIGS. 1*e-f*, wheels 137, 138 can be implemented in a variety of configurations with respect to a body 118 of an example ambulation aid 107, 108. A wheel mount in the front of the body 118 provides and/or is associated with a rig into which the wheels 137, 138 fit. For example, the rig holds a wheel 137, 138 and is then attached to the body 118. As illustrated in the example of FIG. 1*e*, rear wheels are partially hidden and partially exposed by the body 118. The rear wheels are housed within but protrude at least slightly from the body 118, while the front wheels are free of the body 118.

As demonstrated in the example of FIG. 1*f*, all and/or individual wheels 138 can be configured to be exposed from the body 118 of the aid 108. Both front and rear wheels 138 protrude in front and behind body 118 extents so that a user can more easily maneuver the aid 108 to roll the aid 108 up stairs, curb, and/or other obstacle without scraping the body 118. For example, going up stairs, users often traverse the stairs walking backwards and pulling their walker backwards up each tread. Users may act similarly if backing up over a curb. When moving forward, the protruding front wheels help roll up and over obstacles, and having both front wheels and rear wheels protrude from the body 118 of the aid 108 provides increased mobility and stability while also helping to avoid damage (e.g., scraping) to the aid 108. In certain examples, the front wheels can swivel to aid in maneuverability.

FIG. 1*g* shows a further example of a wheel 139 configuration in which the rear wheels are partially hidden from a side view of the body 118 but extend beyond the extent of the body, as demonstrated in the example of FIG. 1*g*.

Figure 2:
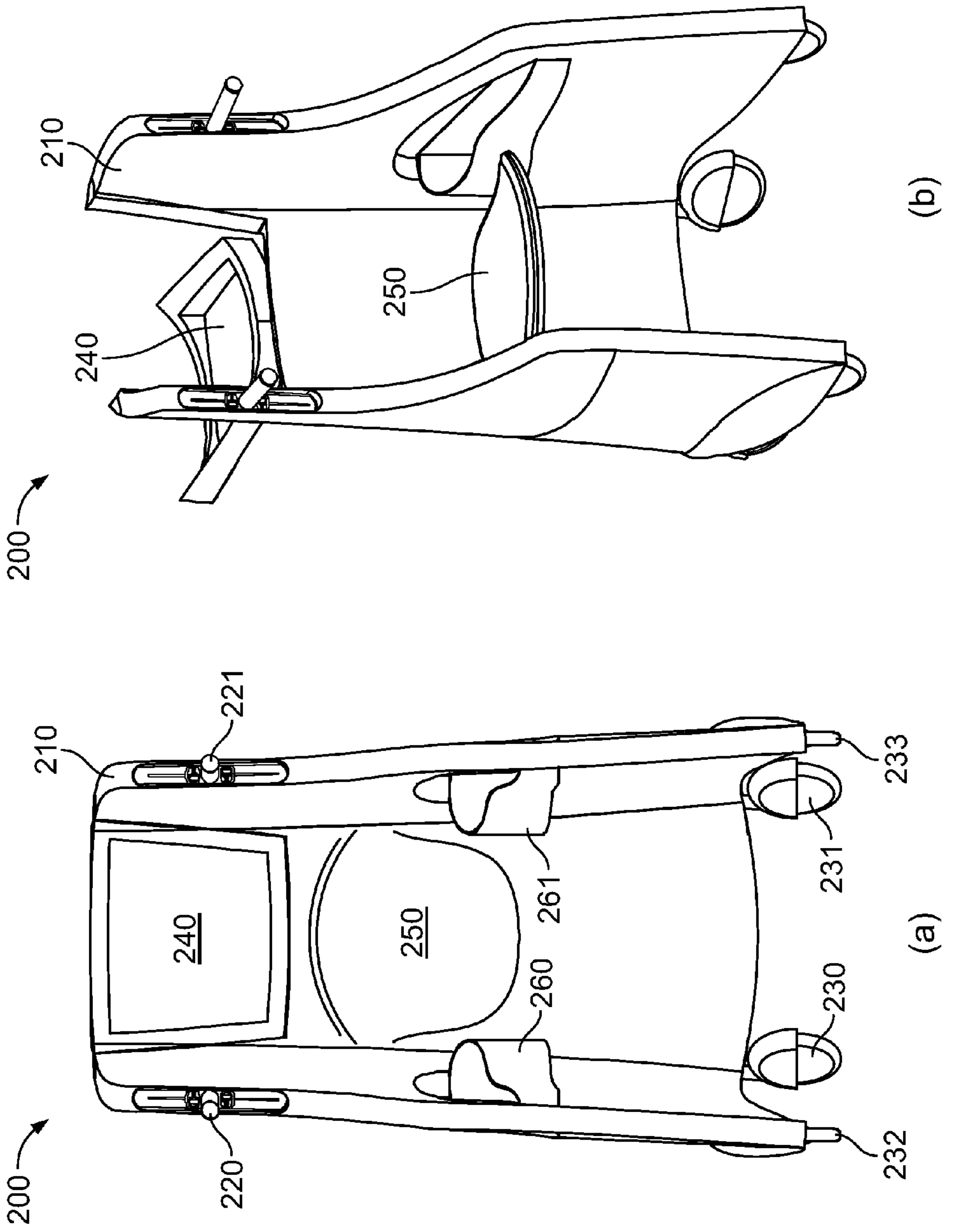
FIGS. 2*a-b* illustrate another example ambulation aid.

FIGS. 2*a-b* illustrate views of another example ambulation aid 200. FIG. 2*a* illustrates a view of the back or inside of the example ambulation aid 200. The example ambulation aid 200 includes a body 210 constructed in a monocoque (e.g., hollow, foam-filled, etc.) form from a polymer-based material. The body 210 incorporates a plurality of accessories or features including handles 220-221, wheels 230-233, a tray 240, a seat 250, storage 260-261, and the like.

For example, the aid 200 may include a tray 240 that "flips out" or otherwise moves from a stored position against or in the body 210 to a position extended from the body 210 for use by a user of the mobility aid 200. In certain examples, the tray 240 can be folded (e.g., in half, in thirds, etc.) to fit within a profile or contour of the body 210 and be usable while folded or unfolded. FIG. 2*b* includes an example representation of the tray 240 folded down for use. The tray 240 may include a cup holder and/or other accessory holder, for example. In some examples, the tray 240 folds in half (and/or otherwise partially folds) and can still be used in an open or folded position. In some examples, the tray 240 tilts away from the back of the ambulation aid 200 to open. In some examples, the tray 240 is pulled up or down from a slot or compartment in the body 210 to open. In some examples, the tray 240 can be supported by resting on elements of the main body and/or by supports that bend or fold with the tray 240, such as straps, cables, etc.

The tray 240 may be implemented as a rigid tray (e.g., plastic, metal, etc.), a flexible tray (e.g., fabric, rubber, soft plastic, etc.), a telescoping tray, a removable tray, etc. Surface (s) of the tray 240 can be supplied with a non-slip surface to prevent objects from sliding around on the tray 240, for example. In some examples, the tray 240 can be supplied separately from the aid 200 and attached by a dealer or an end user via adhesive, mechanical fastener, magnet, Velcro™, etc. In some examples, the tray 240 can be removed for cleaning. In some examples, the tray 240 can be used with a tray cover, which can be disposable, reusable and removable for cleaning, etc.

Similarly, the seat 250 may also fold out from against the body 210 of the ambulation aid 200 or otherwise be extracted from the body 210 to a position perpendicular (or roughly perpendicular) to the body 210 for use by a user of the mobility aid 200. By folding the seat 250 against the body 210 of the ambulation aid 200, a user can walk inside (e.g., walk within the boundary or ambit of) the aid 200 without being affected by the seat 250 or other protrusion, rather than walking behind the aid 200. Being able to walk inside of the aid 200 enables much preferred ergonomic posture and enhanced maneuverability, for example. In some examples, the seat 250 tilts away from the back of the ambulation aid 200 to open. In some examples, the seat 250 is pulled up or down from a slot or compartment in the body 210 to open. In some examples, supports designed as part of the geometry in sides of the body 210 are used to support the seat 250 when folded down. In some examples, the seat 250 can be supported by resting on elements of the main body and/or by supports that bend or fold with the seat 250, such as straps, wires, etc.

The seat 250 may be implemented as a rigid seat (e.g., plastic, metal, etc.), a flexible seat (e.g., fabric, rubber, soft plastic, etc.), a padded or cushioned seat, a removable seat, etc. In some examples, the seat 250 can clip on one side of the body 210 and be stretched across to fasteners on the other side of the body 210 when in use. In some examples, the seat 250 can be supplied separately from the aid 200 and attached by a dealer or an end user via adhesive, mechanical fastener, magnet, Velcro™, etc. In some examples, the seat 250 can be removed for cleaning. In some examples, the seat 250 can be used with a seat cover, which can be disposable, reusable and removable for cleaning, etc. Seat covers and/or cushions of various types can be supplied for customization, for example.

In some examples, a seat 250 is stored in a pocket or compartment inside a hollow wall or panel of the ambulation aid body 210. The seat 250 slides up and out of the pocket and flips over, to be caught by one or more plates and locking pins and stabilized with respect to the body 210. Alternatively or in addition, the seat 250 can interlock with mating geometry formed as part of the body 210 and/or seat 250. The seat 250 can also be adjustable for various seat heights using, for example, one or more of plates and locking pins, an interlocking support geometry, pegs, adjustable fasteners, a sliding track and follower assembly, etc.

The example ambulation aid 200 can also include one or more additional accessories, such as cup holder(s) and/or other storage 260-261, purse and/or bag hook(s), umbrella and/or cane notch(es), etc. In some examples, cup holder and/or other storage 260-261 is formed as part of the body 210. In some examples, the cup holder and/or other storage 260-261 is formed separately and added on to the body 210. In some examples, an umbrella holder holds an umbrella while the umbrella is opened such as via a tube attached to a handle 220-221 track to provide a hands-free umbrella holder for a user. In some examples, an oxygen tank attachment is provided with respect to the body 210 (e.g., toward the bottom of the body 210 so as to maintain balance in the aid 200).

In some examples, storage can hold items even when the body 210 is folded up. That is, a user does not have to remove all items from storage or remove the storage compartment itself in order to fold up the body 210 of the aid 200. Side panels of the body 210 help serve to keep items in storage.

In certain examples, a strap or other closure is provided with respect to the body 210 to hold the aid 200 closed when folded. Closure can be integrated into a body panel hinge as well such that the side panels of the body do not flop around when folded, for example.

In certain examples, the aid 200 can be rolled or otherwise moved while folded and remaining self-standing. In certain examples, the body 210 includes one or more graspable areas to facilitate lifting of the aid 200 from different orientations, such as into a vehicle, while folded.

In certain examples, storage can be provided in a rigid compartment, fabric compartment, mesh, etc. In certain examples, storage can be potentially removable (e.g., saddle bags, soft removable, rigid removable, etc.). Storage may utilize a closure feature (e.g., interlocking lid, zipper, Velcro™, Ziploc™ style sliding closure, snap flap, buckle, etc.) to retain items both when in use or if removed from the ambulation aid 200, for example.

In some examples, the handles 220-221 can be implemented as posts or poles graspable by a user for support and/or mobility. The handles 220-221 can be molded from plastic, die-cast metal, extruded plastic and/or metal, etc. The handles 220-221 can be integrated into the body 210 design. In certain examples, different size mobility aids can be produced with fixed and/or movable handles. One or both of the handles 220-221 can include a brake to slow or stop movement of the aid 200. For example, one or both handles 220-221 can have a parking brake, pull down or push button, etc., such that the aid 200 does not roll away or slide out from under a user.

In some examples, no brakes are provided (e.g., when the body 210 is provided with skids rather than wheels). In certain examples, a foot-activated brake is mounted on a wheel 230-233 of the aid 200 and is activated by the user stepping on the brake. In certain examples, a weight-activated brake can be provided by which, rather than using a handle, the brake is activated with downward pressure applied to the ambulation aid 200. In certain examples, a reverse brake is provided in which a user is to squeeze the brake to release the brake.

In some examples, the handles 220-221 can be implemented as and/or include a bicycle-style hand brake or handle. For example, a brake lever (not shown) associated with one or more of the handles 220-221 can be formed from a bent piece of steel or other metal (and/or joined from separate pieces) that angles itself into a rear wheel 232-233 to slow and lock the wheel(s) 232-233. A user squeezes all or part of the handle 220-221 and/or an associated brake or lever to activate the brake, for example. In some examples, a brake line runs inside a hollow side panel of the body 210 such that the line (not shown) does not snag or otherwise catch on anything external to the body 210.

In some examples, each of the handles 220-221 is positioned in a T-slot track (e.g., mounted on or including a T-slot nut or other connector that slides in a T-slot track) such that the handle 220-221 slides up and down in the T-slot track. The track can be designed into the main body 210 geometry, a separate channel (e.g., metal, plastic, other polymer, etc.) can be inserted into the molding process to be integrated with the plastic body 210 (insert molding), and/or the track can be supplied as a separate part, for example.

In some examples, a cam lock, set screw, snap, button, spring loaded plunger, ball, or other fastener locks and/or otherwise holds the handle 220-221 in place at a point along the track. Using the handles 220-221, a user can adjust a usable height of the ambulation aid 200. Rather than adjusting leg height, a desired height adjustment can be achieved by manipulation of the handles 220-221 along the track.

In some examples, the handle 220-221 and sliding geometry can be combined into one part, which then slides along a track or is fastened at discrete locations (e.g., threaded inserts that can be unscrewed and screwed) along the body 210. The combined part can be molded plastic, die cast metal, welded assembly (e.g., metal or plastic), bonded assembly, threaded assembly, etc. In certain examples, rather than sliding along a track, the handles 220-221 can be fastened at one or more discrete locations along the body 210 via interlocking geometry, threaded fasteners, Velcro™, knob clamp, threaded holes, miter track stops, etc. As another example, handle height can be adjusted via telescoping members protruding from the main body 210 that can be locked into different heights.

Additionally, handles employed in example ambulation aids may include a variety of grips to facilitate user comfort, durability, and control. In some examples, separate grips can be supplied to cover the handles 220-221 to provide comfort and increased graspability. In some examples, one or both handles 220-221 can be implemented as a two-shot injection molded part in which a grip area is a different (e.g., softer, lower durometer, etc.) material than the rest of the part (e.g., a first shot of hard plastic and a second shot of rubber).

Figure 3:
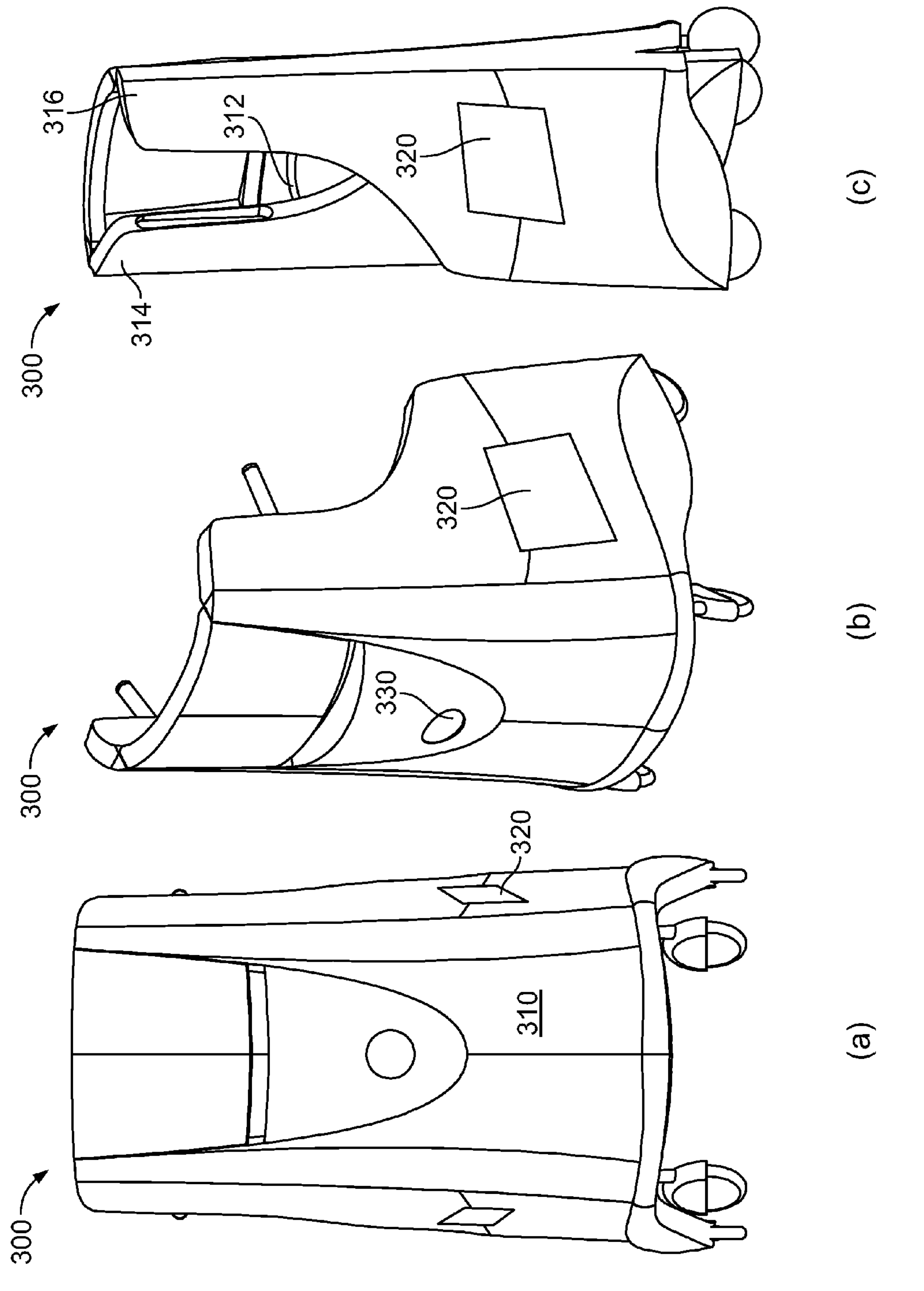
FIGS. 3*a-c* illustrate another example ambulation aid.

FIGS. 3*a*-*c* illustrate views of another example ambulation aid 300. FIG. 3*a* illustrates a front view of the ambulation aid 300. FIG. 3*b* illustrates a three-quarter view of the ambulation aid 300. FIG. 3*c* illustrates a collapsed or folded view of the ambulation aid 300.

The example ambulation aid 300 includes a body 310. As shown in the example of FIG. 3*b*, a decal, logo, picture, and/or other customization can be provided by a manufacturer, seller, and/or user in the customizable display area 320, for example. The customizable display area 320 may be slightly indented with respect to the rest of the body 310, for example, to accept custom decals (e.g., flowers, golf, commercial logo (e.g., sports teams, colleges, business, etc.), photos, etc.) to decorate the ambulation aid 300, for example. In certain examples, the body 310 can include one or more windows, voids, and/or other openings to provide access, air flow, accessory fitting, etc. In certain examples, holes generated to facilitate air flow during forming of the body 310 can be incorporated into and/or hidden by an opening or other feature in the body 310.

As shown in the example views of the ambulation aid 300 provided in FIGS. 3*a*-*b*, an accessory area or mount 330 can be provided in the body 310. The area 330 can be used for a light, reflector, decal, logo, speaker, etc. If the accessory is electronic, a battery and/or other power source can be, for example, positioned behind the accessory in the area 330, otherwise located inside the body 310, and/or attached to the body 310 and/or other attached element, such as a handle track, handle, tray, seat, storage, etc.

As illustrated in the example of FIG. 3*c*, the body 310 includes a main or central body panel 312 as well as first and second side panels 314, 316. When unfolded or otherwise expanded (as shown in FIGS. 3*a*-*b*), the ambulation aid 300 facilitates user movement, stabilization, and/or other support. A user can stand up straight and walk inside (e.g., walk within an ambit or boundary of) the ambulation aid 300 (with a seat in an "up" or stowed position if a seat is presented in the aid 300), rather than behind the aid 300 (unlike most prior walkers which require the user to walk behind and often hunch over). The example of FIG. 3*c* illustrates the aid 300 in a folded or closed position, in which side panels 314, 316 are folded or collapsed against the center panel 312. In certain examples, side panels 314, 316 remain folded through a strap, hinge, retaining mechanism integrated into the hinge, hook, mechanical fastener, Velcro™, etc.

In certain examples, the aid 300 can continue to hold items in storage even when in a folded or collapsed state. While in a folded or collapsed position, the side panels 314, 316 help prevent items in storage from accidentally opening and falling out of the aid 300. Rather than requiring contents or entire storage vessels to be removed from the aid 300, a user can fold the aid 300 for storage, transport, etc., while leaving items securely in the folded aid 300, for example.

As demonstrated in FIG. 3*c*, the aid 300 continues to be self-standing or otherwise self-supportive, even when in a collapsed or folded position, for example. For stability and convenience of storage, the folded walker is designed to be self-supportive rather than required to lean against a surface to remain upright. The folded aid 300 can be rolled and/or otherwise moved without lifting while folded, for example. In certain examples, grab handles or holds are provided in the body 310 to help with moving the aid 300 such as loading the aid 300 into a vehicle. In some examples, the aid 300 is manufactured as a hollow device using twin sheet thermoforming and/or similar process to be produced at a more easily liftable weight.

In some examples, a latch can be used to lock the panels 312, 314, 316 in an open position. The latch engages automatically and/or manually when the panels 314, 316 are opened, for example. A user can disengage (e.g., press, push, pull, lift, etc.,) the latch to release and fold up the panels 314, 316, for example. In certain examples, a hinge used with respect to the panels 312, 314, 316 can provide a locking mechanism. The monocoque structure of the body 310 provides support without extra supporting members that would otherwise get in a user's way. Thus, the user can walk inside the aid 300 rather than behind the aid 300. That is, rather than walking behind the aid 300 structure, the user is able to position himself or herself right up to the monocoque body 310 of the aid 300.

By "walking inside" the aid 300 (e.g., walking within the ambit or boundary defined by the body 310 of the ambulation aid 300), the user can stand up with a normal posture rather than lean forward and hunch behind the aid 300. The user can then more easily and normally reach things by standing right inside the aid 300 and up to/up against the body 310 defining the ambit of the aid 300. Further, positioning of a user inside, rather than behind, the aid 300 facilitates a tighter turning radius, etc., using the aid 300.

For example, as shown in FIGS. 3*a*-*b* (as well as FIGS. 2*a*-*b*, FIGS. 4-5, FIGS. 6*a*, 6*c*, etc), a user can walk from outside a boundary of the ambulation aid 300 to inside the boundary or ambit of the ambulation aid 300 without having to climb over or into anything to do so. The user can walk from outside the boundary (in an exterior space) into an interior boundary of the aid 300 and right up to an inner surface or skin of the body 310 without impediment from the aid 300, for example.

In certain examples, a skid, ski, or slider may be used instead of rear and/or front wheels in the ambulation aid. In some examples, side panels of the ambulation aid can serve as skids to be slid along by a user and/or be sequentially picked up and placed down to advance location. In some examples, treads can be added instead of wheels to facilitate movement. Additionally or alternatively, wheel size may vary (e.g., with respect to all wheels, front wheels versus back wheels, etc.).

Figure 4:
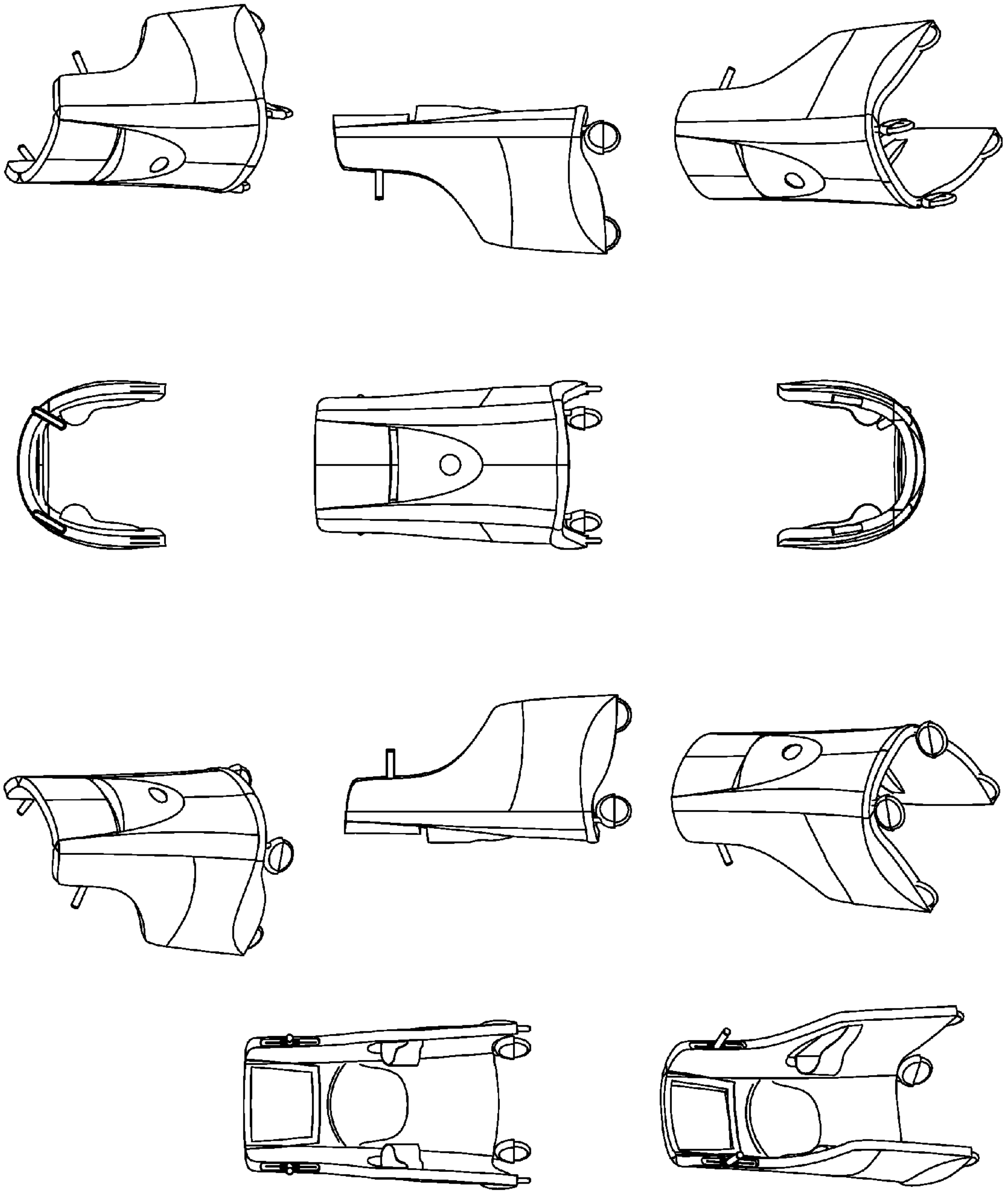
FIGS. 4 and 5 depict additional views of the example ambulation aid shown in FIGS. 3*a-c*.
Figure 5:
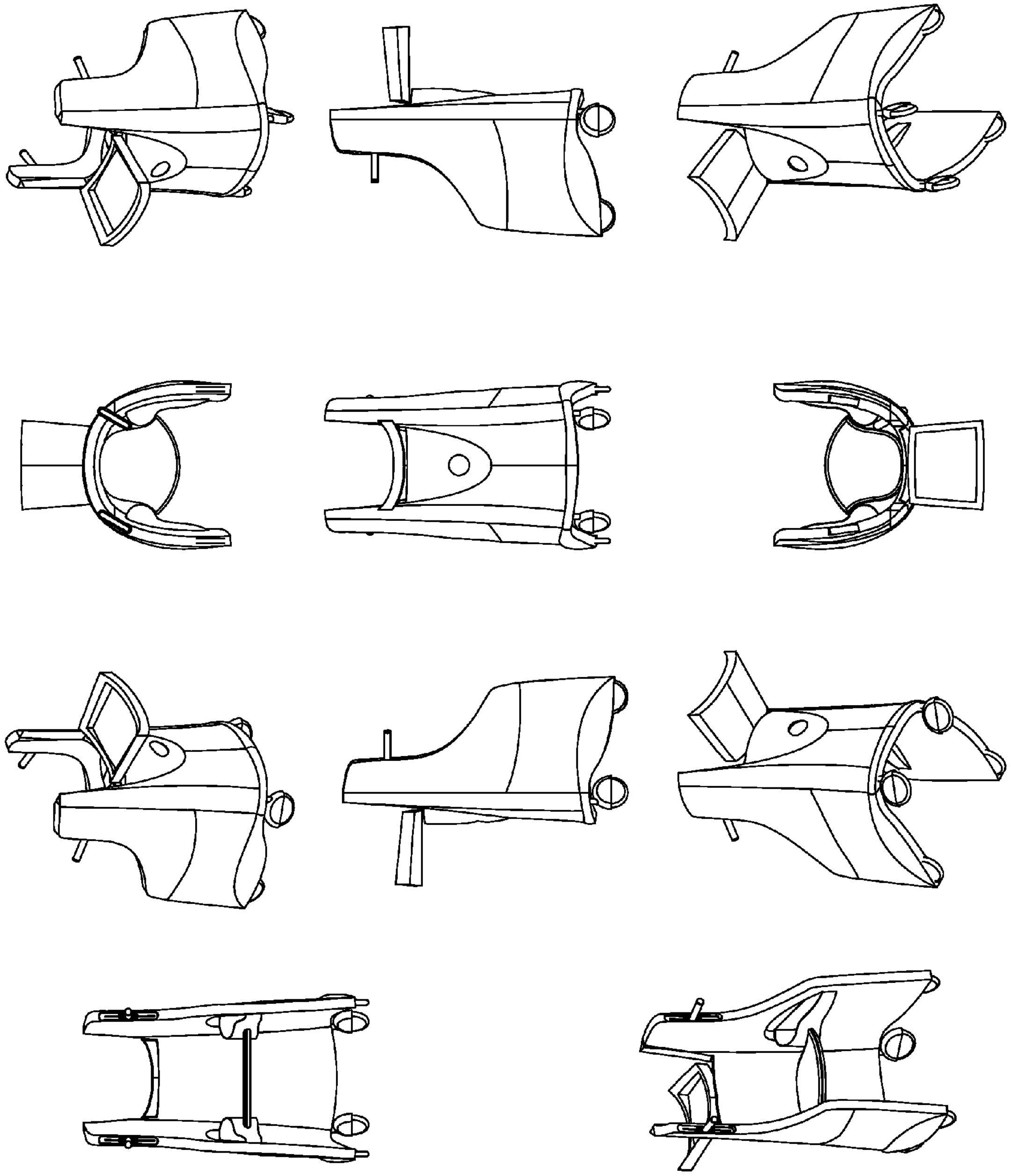

FIGS. 4 and 5 depict additional views of the example ambulation aid 300. FIG. 4 provides views of the example ambulation aid with tray and seat stowed, while FIG. 5 provides views of the example ambulation aid with tray and seat extended.

Figure 6:
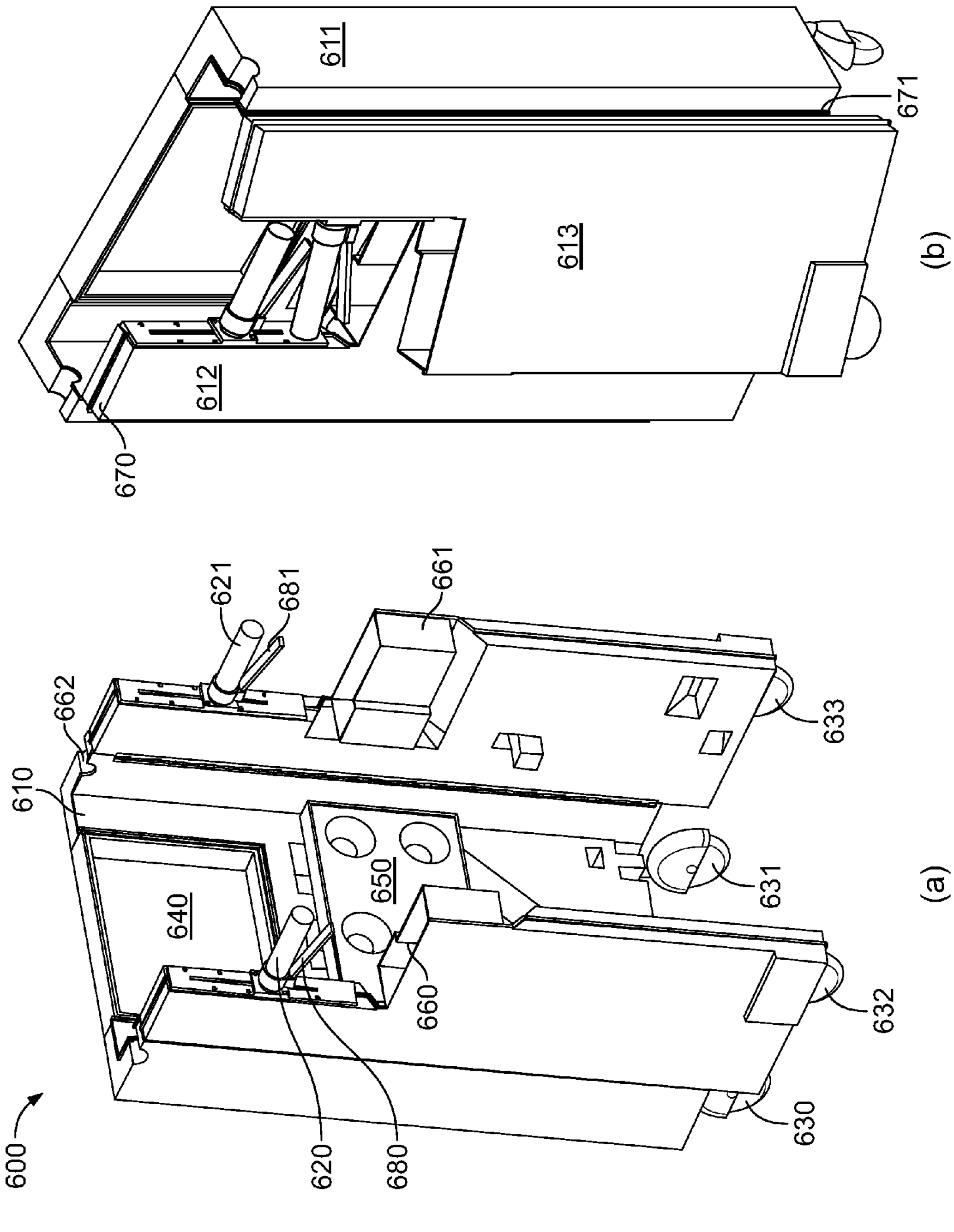
FIGS. 6*a-c* depict another representative implementation of a mobility aid in open and collapsed positions.
Figure 6:
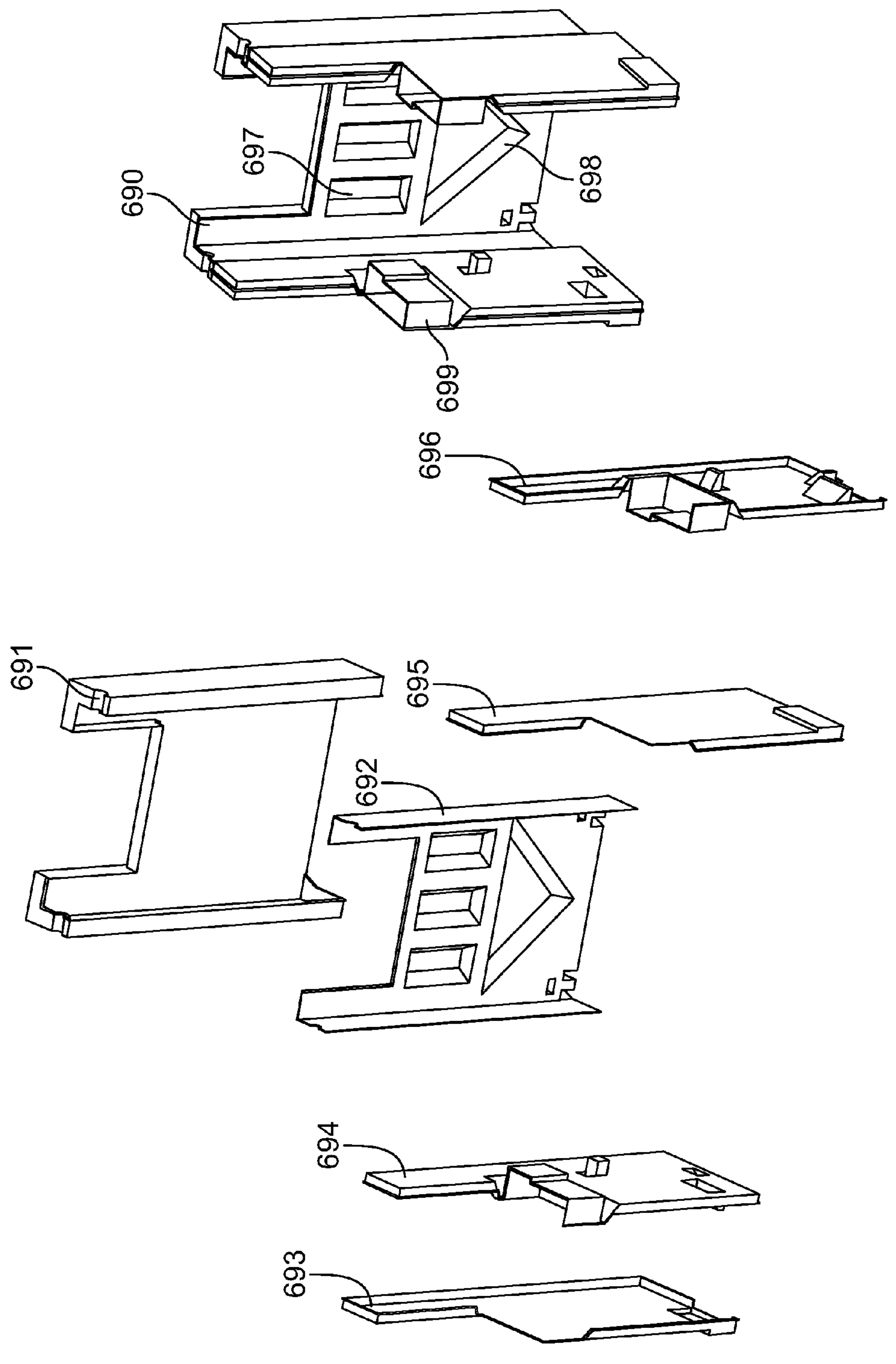

FIGS. 6*a-b* depict another representative implementation of a mobility aid 600 in open (FIG. 6*a*) and collapsed/folded (FIG. 6*b*) positions. The example ambulation aid 600 includes a body 610 constructed in a monocoque form. The body 610 incorporates a plurality of subassemblies (e.g., accessories, features, etc.) including handles 620-621, wheels 630-633, a tray 640, a seat 650, storage 660-661, holder 662, and the like.

For example, the aid 600 may include a tray 640 that "flips out" or otherwise moves from a stored position against or in the body 610 to a position extended from the body 610 for use by a user of the mobility aid 600. In certain examples, the tray 640 can be folded (e.g., in half, in thirds, etc.) to fit within a profile or contour of the body 610 and be usable while folded or unfolded. The tray 640 may include a cup holder and/or other accessory holder, for example. In some examples, the tray 640 folds in half (and/or otherwise partially folds) and can still be used in an open or folded position. In some examples, the tray 640 tilts away from the back of the ambulation aid 600 to open. In some examples, the tray 640 is pulled up or down from a slot or compartment in the body 610 to open. In some examples, the tray 640 can be supported by resting on elements of the main body and/or by supports that bend or fold with the tray 640, such as straps, cables, etc.

The tray 640 may be implemented as a rigid tray (e.g., plastic, metal, etc.), a flexible tray (e.g., fabric, rubber, soft plastic, etc.), a telescoping tray, a removable tray, etc. Surface(s) of the tray 640 can be supplied with a non-slip surface to prevent objects from sliding around on the tray 640, for example. In some examples, the tray 640 can be supplied separately from the aid 600 and attached by a dealer or an end user via adhesive, mechanical fastener, magnet, Velcro™, etc. In some examples, the tray 640 can be removed for cleaning. In some examples, the tray 640 can be used with a tray cover, which can be disposable, reusable and removable for cleaning, etc.

Similarly, the seat 650 may also fold out from against the body 610 of the ambulation aid 600 or otherwise be extracted from the body 610 to a position perpendicular (or roughly perpendicular) to the body 610 for use by a user of the mobility aid 600. By folding the seat 650 against the body 610 of the ambulation aid 600, a user can walk inside the aid 600 without being affected by the seat 650 or other protrusion, rather than walking behind the aid 600. Being able to walk inside of the aid 600 enables much preferred ergonomic posture and enhanced maneuverability, for example. In some examples, the seat 650 tilts away from the back of the ambulation aid 600 to open. In some examples, the seat 650 is pulled up or down from a slot or compartment in the body 610 to open. In some examples, supports designed as part of the geometry in sides of the body 610 are used to support the seat 650 when folded down. In some examples, the seat 650 can be supported by resting on elements of the main body and/or by supports that bend or fold with the seat 650, such as straps, wires, etc.

The seat 650 may be implemented as a rigid seat (e.g., plastic, metal, etc.), a flexible seat (e.g., fabric, rubber, soft plastic, etc.), a padded or cushioned seat, a removable seat, etc. In some examples, the seat 650 can clip on one side of the body 610 and be stretched across to fasteners on the other side of the body 610 when in use. In some examples, the seat 650 can be supplied separately from the aid 600 and attached by a dealer or an end user via adhesive, mechanical fastener, magnet, Velcro™, etc. In some examples, the seat 650 can be removed for cleaning. In some examples, the seat 650 can be used with a seat cover, which can be disposable, reusable and removable for cleaning, etc. Seat covers and/or cushions of various types can be supplied for customization, for example.

In some examples, a seat 650 is stored in a pocket or compartment inside a hollow wall or panel of the ambulation aid body 610. The seat 650 slides up and out of the pocket and flips over, to be caught by one or more plates and locking pins and stabilized with respect to the body 610. Alternatively or in addition, the seat 650 can interlock with mating geometry formed as part of the body 610 and/or seat 650. The seat 650 can also be adjustable for various seat heights using, for example, one or more of plates and locking pins, an interlocking support geometry, pegs, adjustable fasteners, a sliding track and follower assembly, etc.

As demonstrated in FIG. 6*b*, the body 610 of the ambulation aid 600 can be folded to occupy less space for storage, transport, etc. In some examples, the body 610 includes a plurality of segments, sections, or panels 611-613 joined by a hinge 670-671, such as a piano or continuous hinge, living hinge, barrel hinge, mortised hinge, strap hinge, h-hinge, etc. For example, a single living hinge may be formed when two segments of the body 610 (right side and left side) are formed together as a single part with a thinner, flexible hinge or bearing created in the material at manufacture. Two living hinges are formed when three segments of the body 610 (middle, right side, and left side) are formed together as a single part, for example.

In certain examples, the hinge 670-671 can be molded into the body 610 or the hinge 670-671 can be molded from the body 610, rather than being a separate component. For example, a hinge 670-671 can be formed by creating knuckles into the twin sheets used in thermoforming the body 610, which then may be trimmed and/or drilled if necessary and/or desired. A pin can then be dropped or otherwise placed between the knuckles to join the knuckles into a working hinge. In some examples, the hinge 670-671 can be formed using blow molding, rotational molding, gas assist injection, molding, injection molding, etc., rather than thermoforming. If molding (e.g., injection molding, blow molding, rotational molding, etc.) is used instead of thermoforming, then two hinge parts can be molded in the body 610 which then interlock to form the hinge. In certain examples, a separate mechanical or living hinge can be placed into the mold during any of these processes and incorporated during the molding process.

When folded, the ambulation aid 600 remains self-standing, rather than having to be leaned against something else for support. The aid 600 can also be rolled and/or otherwise moved while remaining self-standing when folded. Using monocoque construction, the ambulation aid 600 can be kept at a light weight to aid in lifting, transport, and/or other movement. For example, using a hollow polymer construction, the ambulation aid 600 can be kept at a weight of less than fifteen pounds to aid in lifting, transport, and other movement of the aid 600, for example.

The example ambulation aid 600 can also include one or more additional accessories, such as cup holder(s) and/or other storage 660-661, purse and/or bag hook(s), umbrella and/or cane holder(s) 662, etc. In some examples, cup holder and/or other storage 660-662 is formed as part of the body 610. In some examples, the cup holder and/or other storage 660-662 is formed separately and added on to the body 610. In some examples, the umbrella and/or cane holder(s) 662 can be implemented as a notch, hole, slot, hook, etc., molded into the body 610 and/or a strap, hook, clamp, etc., added on the body 610. In some examples, an umbrella holder holds an umbrella while the umbrella is opened such as via a tube attached to a handle 620-621 track to provide a hands-free umbrella holder for a user. In some examples, an oxygen tank attachment is provided with respect to the body 610 (e.g., toward the bottom of the body 610 so as to maintain balance in the aid 600).

In some examples, storage can hold items even when the body 610 is folded up. That is, a user does not have to remove all items from storage or remove the storage compartment itself in order to fold up the body 610 of the aid 600. Side panels of the body 610 help serve to keep items in storage.

In certain examples, a strap or other closure is provided with respect to the body 610 to hold the aid 600 closed when folded. Closure can be integrated into a body panel hinge 670-671 as well such that the side panels 612-613 of the body 610 do not flop around when folded, for example.

In certain examples, the aid 600 can be rolled or otherwise moved while folded and remaining self-standing. In certain examples, the body 610 includes one or more graspable areas to facilitate lifting of the aid 600 from different orientations, such as into a vehicle, while folded.

In certain examples, storage can be provided in a rigid compartment, fabric compartment, mesh, etc. In certain examples, storage can be potentially removable (e.g., saddle bags, soft removable, rigid removable, etc.). Storage may utilize a closure feature (e.g., interlocking lid, zipper, Velcro™, Ziploc™ style sliding closure, snap flap, buckle, etc.) to retain items both when in use or if removed from the ambulation aid 600, for example.

In some examples, the handles 620-621 can be implemented as posts or poles graspable by a user for support and/or mobility. The handles 620-621 can be molded from plastic, die-cast metal, extruded plastic and/or metal, etc. The handles 620-621 can be integrated into the body 610 design. One or both of the handles 620-621 can include a brake 680-681 to slow or stop movement of the aid 200. For example, one or both handles 620-621 can have a parking brake, pull down or push button, etc., such that the aid 600 does not roll away or slide out from under a user.

In some examples, no brakes are provided (e.g., when the body 610 is provided with skids rather than wheels). In certain examples, a foot-activated brake is mounted on a wheel 630-633 of the aid 600 and is activated by the user stepping on the brake. In certain examples, a weight-activated brake can be provided by which, rather than using a handle, the brake is activated with downward pressure applied to the ambulation aid 600. In certain examples, a reverse brake is provided in which a user is to squeeze the brake to release the brake.

In some examples, the handles 620-621 can be implemented as and/or include a bicycle-style hand brake or handle 680-681. For example, a brake lever 680-681 associated with one or more of the handles 620-621 can be formed from a bent piece of steel or other metal (and/or joined from separate pieces) that angles itself into a rear wheel 632-633 to slow and lock the wheel(s) 632-633. A user squeezes all or part of the handle 620-621 and/or an associated brake or lever 680-681 to activate the brake, for example. In some examples, a brake line runs inside a hollow side panel of the body 610 such that the line (not shown) does not snag or otherwise catch on anything external to the body 610.

In some examples, each of the handles 620-621 is positioned in a T-slot track (e.g., mounted on or including a T-slot nut or other connector that slides in a T-slot track) such that the handle 620-621 slides up and down in the T-slot track. The track can be designed into the main body 610 geometry, a separate channel (e.g., metal, plastic, other polymer, etc.) can be inserted into the molding process to be integrated with the plastic body 610 (insert molding), and/or the track can be supplied as a separate part, for example.

In some examples, a cam lock, set screw, snap, button, spring loaded plunger, ball, or other fastener locks and/or otherwise holds the handle 620-621 in place at a point along the track. Using the handles 620-621, a user can adjust a usable height of the ambulation aid 600. Rather than adjusting leg height, a desired height adjustment can be achieved by manipulation of the handles 620-621 along the track.

In some examples, the handle 620-621 and sliding geometry can be combined into one part, which then slides along a track or is fastened at discrete locations (e.g., threaded inserts that can be unscrewed and screwed) along the body 610. The combined part can be molded plastic, die cast metal, welded assembly (e.g., metal or plastic), bonded assembly, threaded assembly, etc. In certain examples, rather than sliding along a track, the handles 620-621 can be fastened at one or more discrete locations along the body 610 via interlocking geometry, threaded fasteners, Velcro™, knob clamp, threaded holes, miter track stops, etc. As another example, handle height can be adjusted via telescoping members protruding from the main body 610 that can be locked into different heights.

Additionally, handles 620-621 employed in example ambulation aids may include a variety of grips to facilitate user comfort, durability, and control. In some examples, separate grips can be supplied to cover the handles 620-621 to provide comfort and increased graspability. In some examples, one or both handles 620-621 can be implemented as a two-shot injection molded part in which a grip area is a different (e.g., softer, lower durometer, etc.) material than the rest of the part (e.g., a first shot of hard plastic and a second shot of rubber).

As shown in the example of FIGS. 6*a-b*, wheels 630-633 can be implemented as a variety of wheels including caster wheels. A wheel mount area is provided on the body 610 and provides and/or is associated with a rig into which the wheels 630-633 fit. For example, the rig holds a wheel 630-633 and is then attached to the body 610.

FIG. 6*c* illustrates an exploded view of an example ambulation aid 690. As illustrated in the example of FIG. 6*c*, inside front 691 outside front 692 panels and inside and outside side panels 693-696 can be formed and combined into a monocoque ambulation aid 690. As will be discussed further below, areas of formation, fusing, or joining between different sheets/sets of material can result in “kiss offs”, often visible in the resulting part. By hiding and/or otherwise blending kiss offs and/or near kiss offs with detail lines and structured geometry 697-699, blemishes due to forming can be reduced or hidden from the user, for example.

Figure 7:
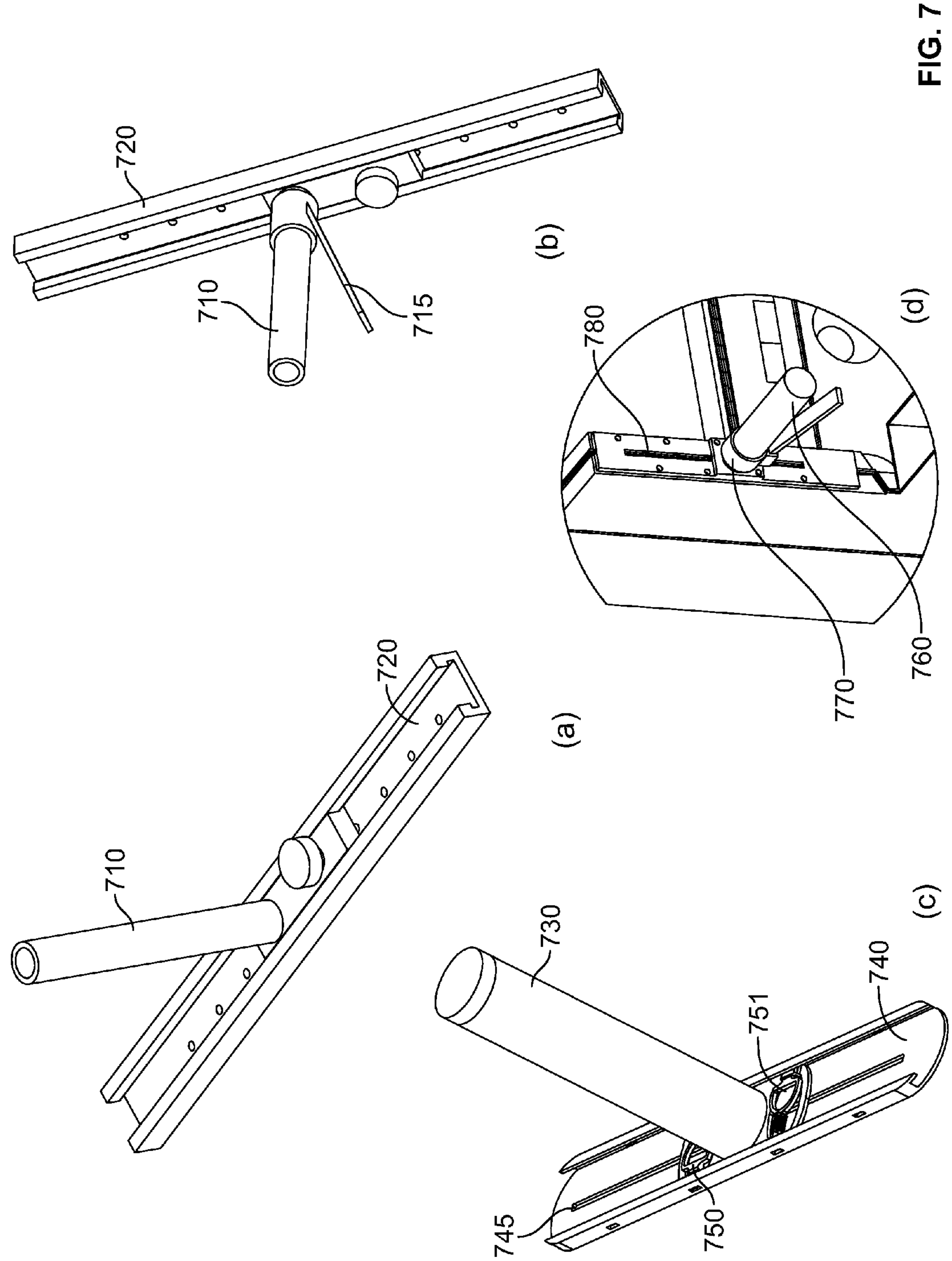
FIGS. 7*a-d* illustrate example handle configurations facilitating movement of a handle moveably affixed to a body of an ambulation aid.

FIGS. 7*a-c* illustrate example handle configurations facilitating movement of a handle moveably affixed to a body of an ambulation aid. FIGS. 7*a-b* illustrate example T-slot configuration for a handle 710 within a track 720 including a brake mechanism 715. FIG. 7*c* shows an example mechanism to adjust handle height, in which a handle 730 is held in place along a track 740 with one or more sprung pins 750-751. The handle 730 can be attached to a shuttle in the track 740 and/or can be combined with a shuttle into one subassembly (e.g., with or without an associated braking mechanism). Parts of the handle mechanism can be manufactured using plastic and/or other extrusion, stamping, and/or forming of sheet material separately and/or as part of the main body of the ambulation aid, for example. A slot or hole 745 is provided in the track 740 to allow for a brake cable, extending from an optional hand brake attached to the handle, to pass into the interior of a side panel of an ambulation aid, between the walls, and feed down to an optional wheel brake. Concealing the cable in this way prevents potential snags in use and also adds to the overall cosmetic appeal of the design, for example. FIG. 7*d* illustrates an example of a handle 760 attached to a mounting plate 770 with a slot 780 to allow for a brake cable to pass between walls of the ambulation aid to a brake on the wheel and remain hidden from view.

Figure 8:
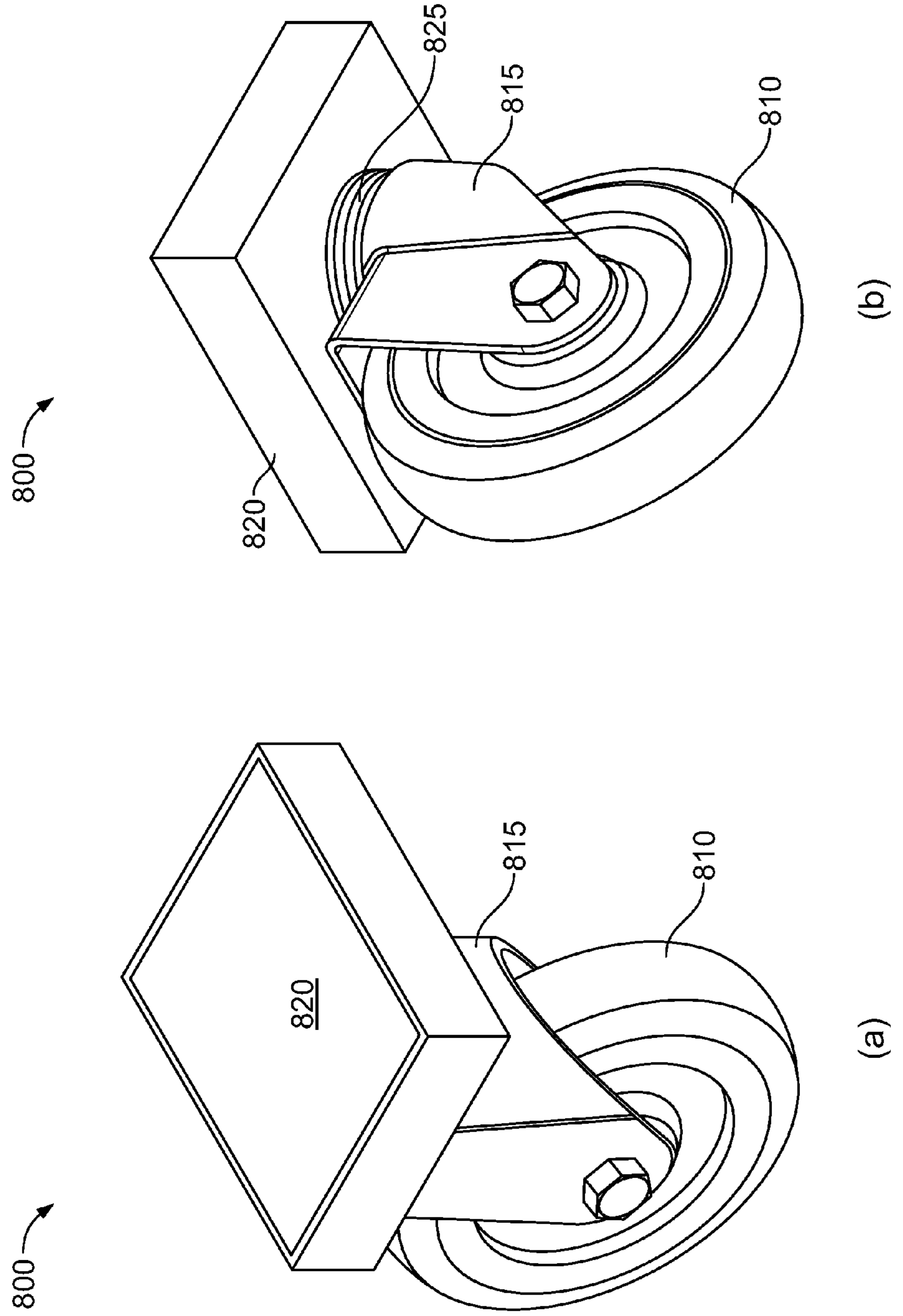
FIGS. 8*a-b* depict an example wheel mount to be used with an ambulation aid

FIGS. 8*a-b* depict an example wheel mount 800 including a wheel 810 (e.g., a caster, etc.) affixed to a rig 815 and joined or pivotably attached to a cap or mount 820. The mount 820 can be affixed and/or otherwise positioned with respect to an ambulation aid body. The wheel 810 may or may not swivel with respect to the rig 815, and/or the rig 815 may or may not swivel with respect to the mount 820. In certain examples, if the wheel 810 is fixed and does not swivel, the rig 815 and mount 820 can be implemented as a single component. As shown in the example of FIG. 8*b*, however, the rig 815 can be connected to the cap or mount 820 via a swiveling joint 825. The joint 825 allows the wheel 810 to swivel relative to the mount 820 and aid body. In certain examples, an enlarged mounting surface provides improved displacement of forces encountered by the wheel 810 during use to a larger area of the ambulation aid body structure.

Figure 9:
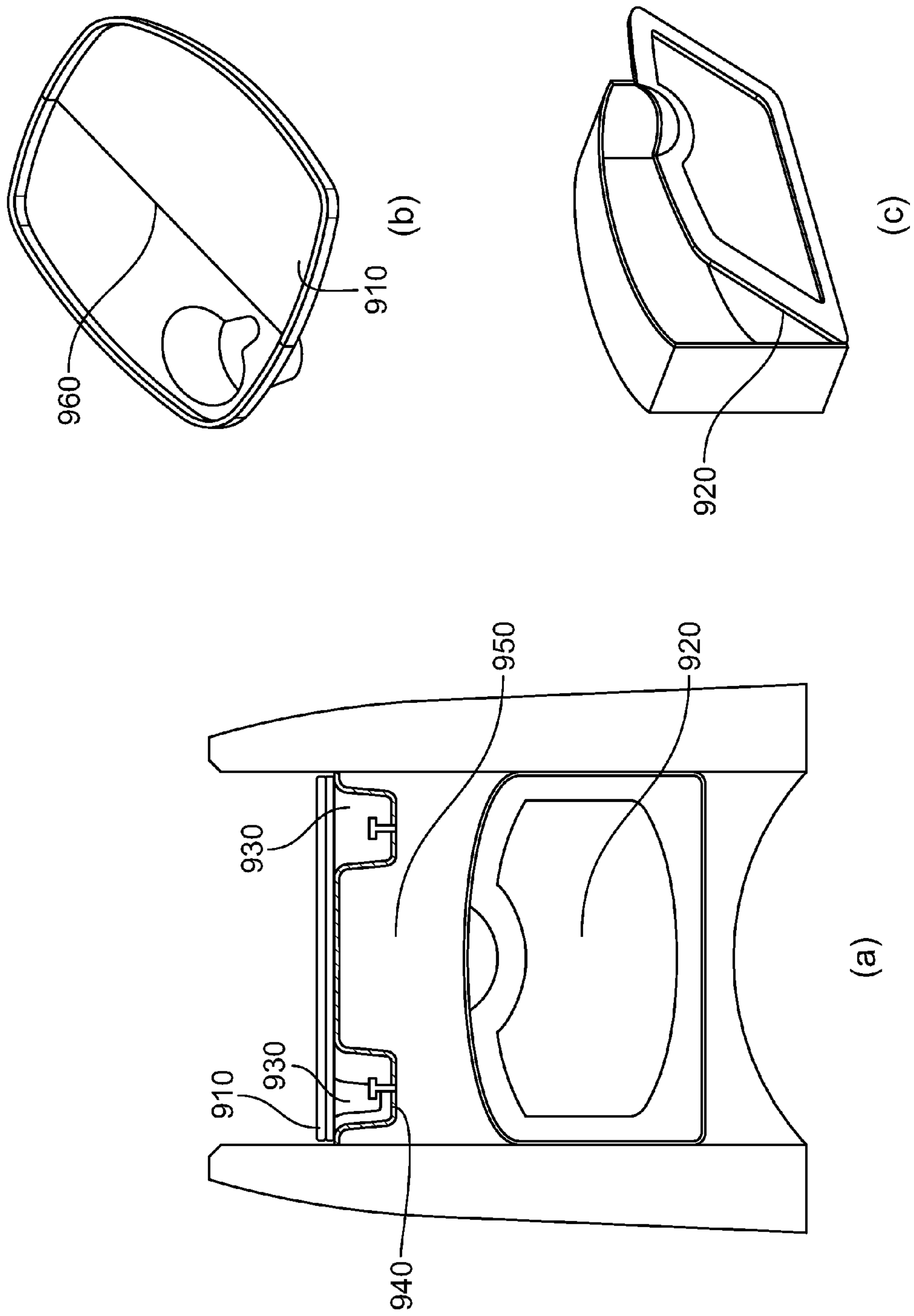
FIGS. 9*a-c* show example subassemblies to be provided with an ambulation aid.

FIGS. 9*a-c* show an example tray 910 and storage compartment 920 to be provided with an ambulation aid. As illustrated in the example of FIG. 9*a*, a flip out tray 910 and a storage compartment 920 are provided inside a front panel of an ambulation aid. In certain examples, a main body of the ambulation aid includes channel(s) 930 to accommodate storage including one or more cup holders and hooks 940 without creating an undercut that would prevent molding of the ambulation aid. In certain examples, a cup holder is integrated into the tray, rather than being separate. The hook(s) 940 can be recessed into the channel 930 under the tray 910 to prevent the hook(s) 940 from protruding into a back rest area 950, for example. A hook 940 can be used for purse, bag, and/or other storage, for example. In some examples, as shown in FIG. 9*b*, the tray 910 is foldable along a fold line 960. The tray 910 can be held closed via a mechanical, magnetic, friction, fastener, Velcro™, and/or other closure, for example. In certain, example, the tray 910 can be height adjustable using, for example, locking pins, an interlocking support geometry, pegs, adjustable fasteners, a sliding track and follower assembly, etc.

In certain examples, the back rest 950 can be fitted with permanent or removable cushioning and/or cover. The back rest 950 can also be height adjustable, for example.

In certain examples, the tray 910 includes a handle (not shown) to enable a user to pull the tray 910 from a storage compartment in the ambulation aid and return the tray 910 to the storage compartment when done. The handle can be formed as part of the tray 910 and/or attached as a separate element, for example. In certain examples, rather than a handle, a strap, a lip, an indentation in the tray 910, and/or other graspable point can be provided to move and position the tray 910.

The storage compartment door 920 is positioned in the example below the tray 910 and back rest 950 on an inside front panel of the example ambulation aid. As illustrated in FIG. 9*c*, the storage compartment door 920 can tilt open to provide access to the storage compartment. The storage compartment door 920 can be held closed via a magnet, strap, mechanical fastener, Velcro™, and/or other closure, for example, to secure items placed in the storage compartment (e.g., whether the ambulation aid is open, closed, etc.).

Figure 10:
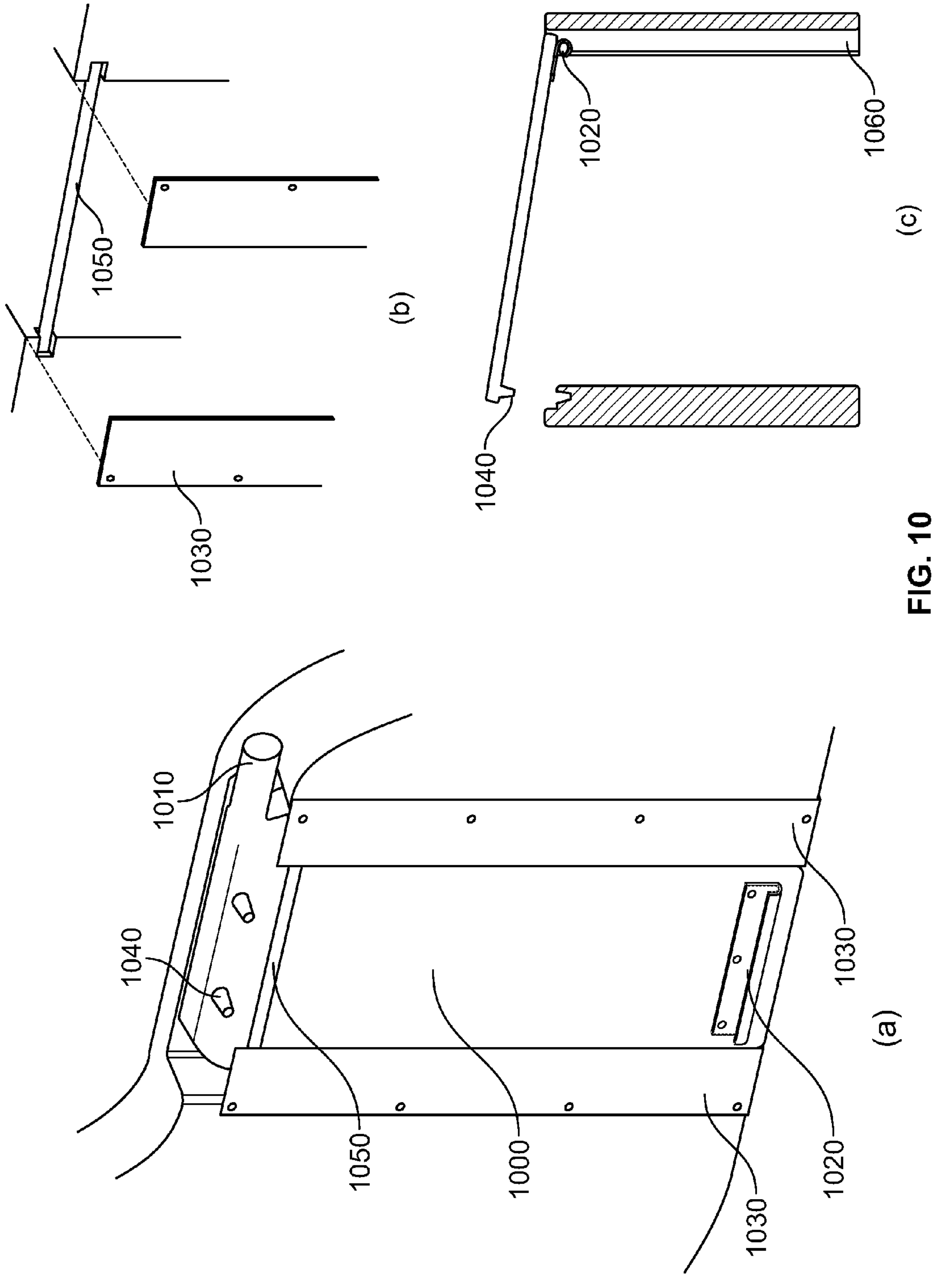
FIGS. 10*a-c* show an example seat to be provided with an ambulation aid.

FIGS. 10*a-c* show an example seat 1000 to be provided with an ambulation aid. The seat 1000 includes a handle 1010 to enable a user to pull the seat 1000 from a storage compartment in the ambulation aid and return the seat 1000 to the storage compartment when done. The handle 1010 can be formed as part of the seat 1000 and/or attached as a separate element, for example. In certain examples, rather than a handle 1010, a strap, a lip, an indentation in the seat 1000, and/or other graspable point can be provided to move and position the seat 1000. The example seat 1000 also includes a "J" hook 1020, plates 1030, pins 1040, and a rod 1050.

In some examples, the seat 1000 is stored in a pocket or compartment inside a hollow wall or panel of the ambulation aid. The seat 1000 slides up and out of the pocket and flips over, to be caught by one or more locking pins 1040. As shown in FIG. 10*b*, a plate 1030 captures the rod 1050 in a slot provided for the seat 1000 and also retain the seat 1000 in the pocket when stowed. As shown in the example of FIG. 10*c*, the pin 1040 locks into the panel, while the "J" hook 1020 catches on the rod 1050. Alternatively or in addition, pins 1040 may interlock or nest, rather than locking. An interlocking geometry can be molded into the seat 1000 and/or side panel, for example.

In some examples, a pocket 1060 can be open, closed, and/or openable on the bottom. A closed pocket 1060 can protect the seat 1000 surface from ground debris, dirt, water, etc.

Figure 11:
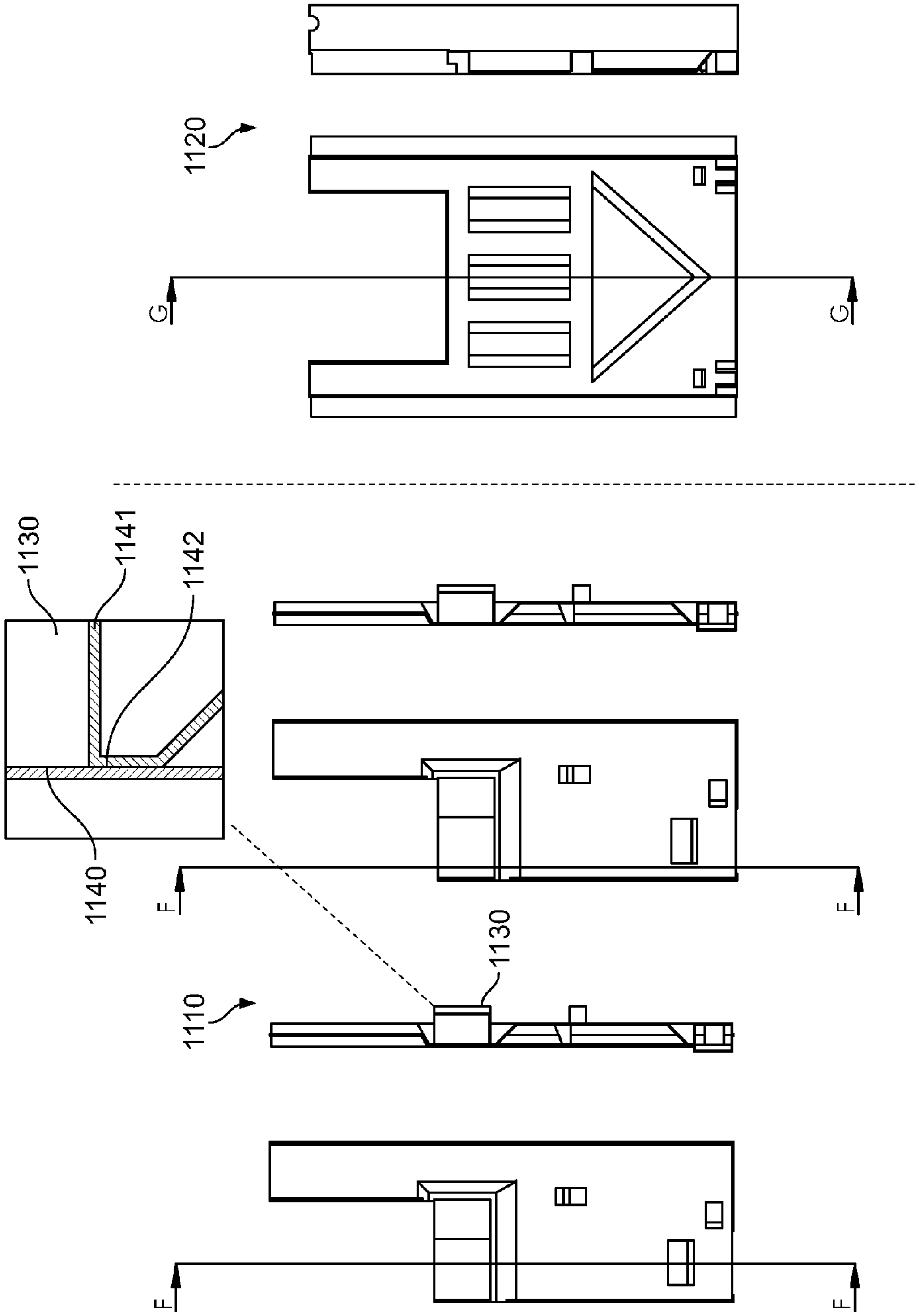
FIG. 11 shows cross-sectional views of a front panel and a side panel of an example ambulation aid.

FIG. 11 shows cross-sectional views of front and side panels 1110, 1120 of an example ambulation aid, including various opportunities to "kiss off," mating the two walls of the aid for additional strength and stability, or "near kiss" where the two walls are almost mating but not quite, which alleviates issues with witness marks affecting appearance. A "kiss off" is when two pieces of material (e.g., plastic or other polymer) come together to form the part. As shown in the expanded detail view 1130, based on ornamental surface lines and functional seams 1140-1141 and openings in the panel, kiss off points 1142 can be minimized or hidden so as not to distract from the aesthetic appearance of the ambulation aid. As demonstrated in FIG. 11, an outside mold and an inside mold are used to form two sheets of plastic, which are then pushed together to create the integral part (e.g., the mobility aid or walker body panel). As opposed to tubular metal or PVC, such molding and forming provides a hollow, structurally sound, and adaptable unibody/integral monocoque part for the mobility aid, while maintaining a lighter weight.

In certain examples, different materials can be used in the manufacturing process to provide a range of ambulatory aid products with varying characteristics. Ambulatory aid products can be formed from polymer material, metal, fiberglass, etc. For example, high-density polyethylene (HDPE), acrylonitrile butadiene styrene (ABS), ABS with an acrylic cap, acrylic, thermoplastic olefin (TPO), polypropylene (PP), polycarbonate (PC), polyethylene (PE), polyethylene terephthalate (PET), polyethylene terephthalate glycol-modified (PETG), etc., can be used to form panels and/or accessory parts of an ambulation aid. Further, laminated films and/or other printed graphics, screen printed, pad printed, etched, textured, etc., can provide decorative effects (e.g., carbon fiber, brushed metal, wood grain, logos (e.g., sports team, etc.), photos, etc.) applied, co-extruded, co-cast, etc., to a plastic substrate, such an ABS or TPO substrate, with or without an acrylic over cap layer. In certain examples, the interior and exterior can be different colors and materials, such as having a glossy metallic exterior material and a textured or soft touch, leather-like material on the interior. Acrylic, PC, PP, PET, PEG, RPET, or the like can be used to create a clear part. Using thermoplastics, such as HDPE, TPO, PP, PE, PET, PETG, etc., enables portions of the body to be formed as a living hinge, including an ability to mold the tray and/or the seat as part of the main body using a living hinge configuration, for example. Alternatively, components such as the seat, tray, etc., can be molded separately and attached with a separate hinge, for example.

In certain examples, an ambulation aid is constructed using a polymer material to create a hollow, structurally stable panel or set of panels. Such construction can be accomplished in a single step by manufacturing processes such as, but not limited to, rotational molding, blow molding, injection molding (e.g., with or without a foaming agent), gas assisted injection molding (e.g., with or without a foaming agent), extrusion, or twin sheet thermoforming. Alternatively or additionally, two or more separate parts can be created and later joined together to create a hollow part. The separate parts can be created by manufacturing processes such as, but not limited to, injection molding, thermoforming, extrusion, slumping, etc. These parts can then be joined by processes such as, but not limited to, adhesive bonding, chemical welding, ultrasonic welding, snap/interlocking fit, thermal bonding, etc.

In certain examples, part(s) can also be created by laying or spraying fiberglass type material, carbon fiber, etc. For example, a flat sheet of fiberglass material can be formed into a part and/or ambulation aid structure, for example. Chopped fiberglass can be sprayed over and/or into a mold to form a part. A composite material can be created by spraying and/or laying up fiberglass onto/into another shell material (e.g., formed plastic or other polymer, etc.) for added structural integrity. Additionally, part(s) can be stamped out of metal and welded, brazed, soldered, mechanically fastened, interlocking/snap fit, and/or glued together, for example. In certain examples, lost core (e.g., sand, wax, etc.) casting methods can be used to create a hollow metal part. Die cast part(s) can also be created. In certain examples, inflatable part(s) can be formed.

Figure 12:
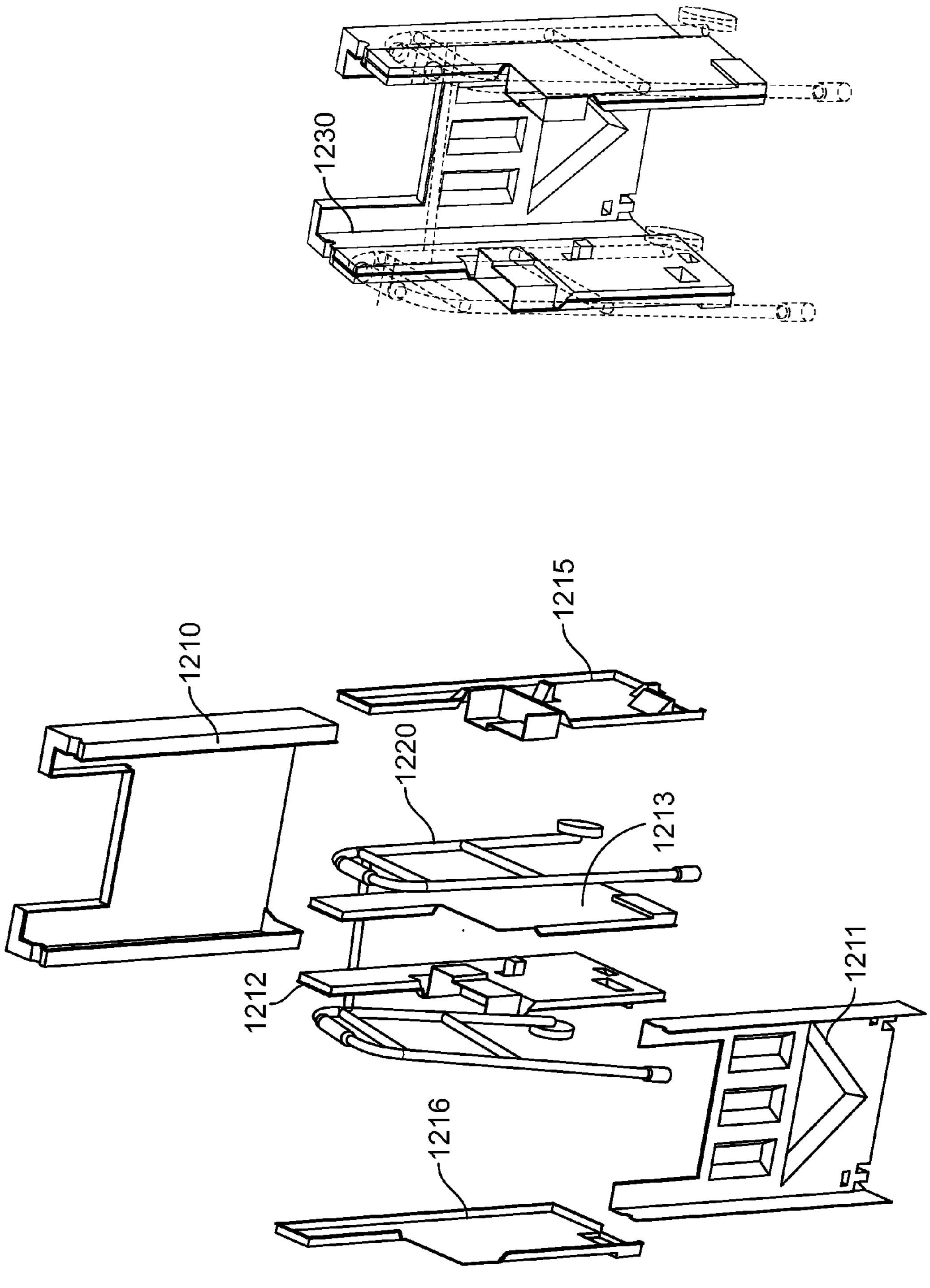
FIG. 12 shows an example ambulation aid including snap-on type covers added over a frame.

In certain examples, a filler, such as foam, can be inserted in a hollow shell to provide additional support. In certain examples, a solid form such as solid foam can be formed (e.g., machined) and skinned for appearance and/or structure. A foaming agent can be used with injection molding to create a semi-hollow/hollow part, for example, In certain examples, such as an example depicted in FIG. 12, one or more snap-on type covers can be added over a frame to provide an ambulation aid or component part(s). As shown in the example of FIG. 12, panels 1210-1216 are snapped or otherwise affixed onto a frame 1220 to provide an ambulation aid 1230. Panels 1210-1216 can provide support, decoration, etc. In certain examples, panels 1210-1216 can be used to create a body-on-frame, unibody, or unitary design, for example.

In certain examples, a cover can be stretched over a frame, instead of or in addition to being snapped on. Alternatively or in addition, a cover can be slipped over a frame. Covers can also attach to each other, inside and outside, versus attaching to a frame.

For example, foam (e.g., light but rigid foam) can be injected into a hollow polymer body to help support the hollow body. Inserted foam can add to strength of the body (e.g., for a bariatric version of an ambulation aid to support 500 lbs). Foam insertion can be done as part of twin sheet thermoforming or after the part has been thermoformed. In some examples, a honeycomb or lattice (e.g., cardboard honeycomb soaked in resin) can be used as an insert into a hollow body to add strength to the hollow part.

Additional strength can also be provided via additional inserted structural elements (e.g., metal, plastic, fiberglass, etc.), internal and/or external to the body, for example. In certain examples, ribbing and/or other features aside from kiss offs/near kiss offs can be provided in the design of the monocoque ambulation aid structure to help provide strength and stability.

Example Methods of Manufacture

Figure 13:
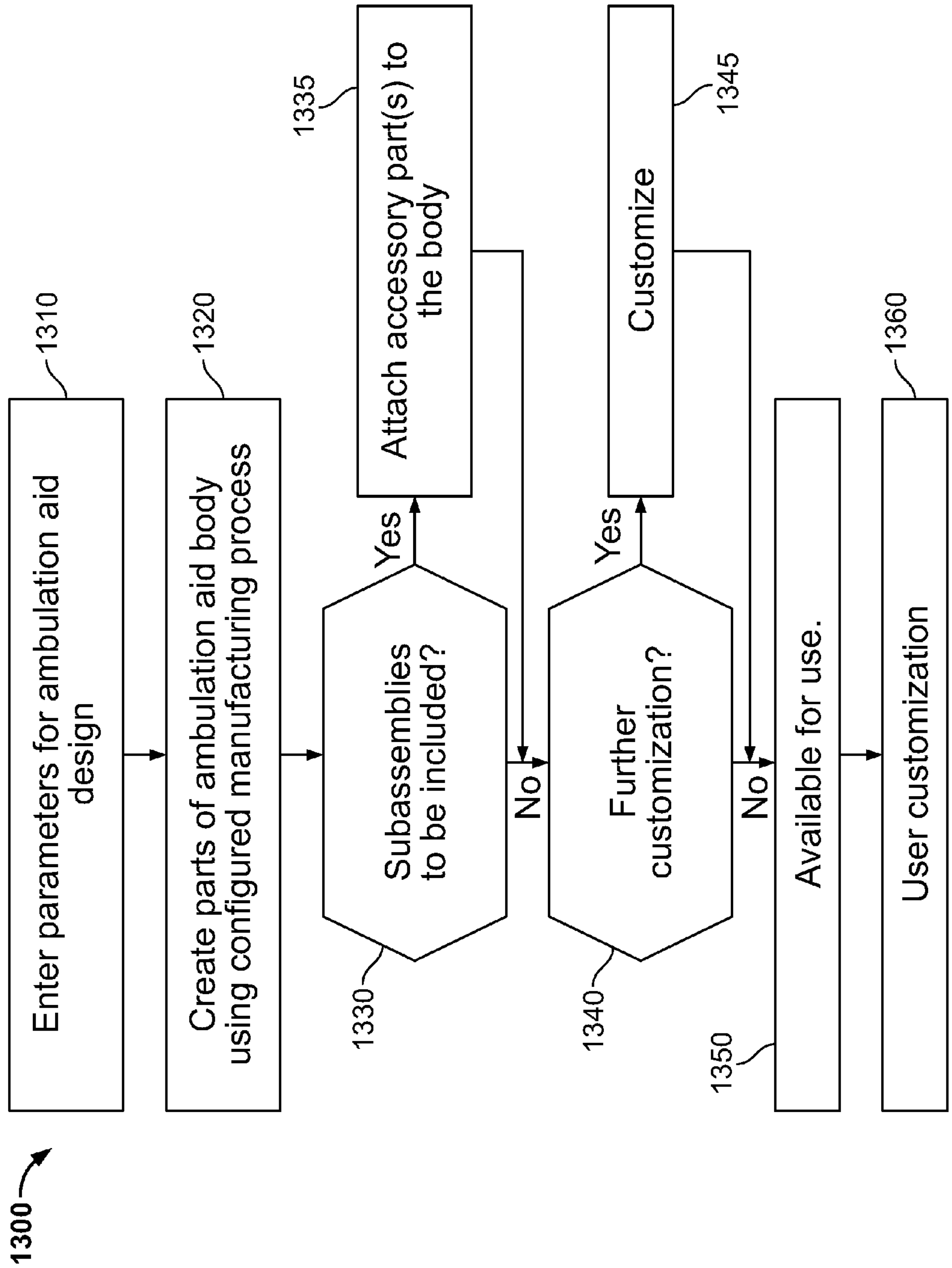
FIG. 13 illustrates a flow diagram of an example method to manufacture an ambulation aid.

FIG. 13 illustrates a flow diagram of an example method 1300 to manufacture an ambulation aid. At block 1310, parameters for design of an ambulation aid are entered. For example, a process can be selected and configured for thermoforming, blow molding, injection molding, slumping, etc. Parameters regarding shape, thickness, spacing, accessory(-ies), color, texture, other customization, etc., can also be specified. Parameters may be used to configure a machine and/or process for manufacture of one or more part(s) of the ambulation aid. Initial input parameters and customization for a particular design can be provided for the manufacturing process.

At block 1320, one or more parts of the body of the ambulation aid are created using a configured manufacturing machine and/or process. For example, using a forming process such as thermoforming (e.g., twin sheet thermoforming), blow molding, rotational molding (also referred to as rotomolding), etc.). In twin sheet thermoforming, for example, two sheets of material are first formed and then fused to form an integral body for the ambulation aid. In blow molding or rotational molding, material is provided into a mold and then formed into an integral body for the ambulation aid, for example.

At block 1330, the process determines whether one or more subassemblies are to be included. If so, then, at block 1335, one or more accessory part(s) are attached to the body. For example, one or more handles, wheel(s), skid(s), tread(s), tray, seat, storage, and/or the like can be attached to the integral body. Attachments can be formed and/or provided as previously-formed components to the process, for example.

At block 1340, customization of the ambulation aid is identified. For example, a manufacturer, retailer, and/or end user may specify additive(s)/treatment(s) such as one or more layers, colors, paints, laminates, metal flakes, graphics, pad printing, screen printing, laser etching, other surface treatment, etc., to be included in the ambulation aid. If so, then, at block 1345, the aid is customized for the user. For example, one or more such additive(s)/treatment(s) can be added to and/or otherwise integrated into the ambulation aid. In certain examples, one or more of such customizations can be provided as part of the creating of the integral body. Alternatively or in addition, one or more of such customizations can be provided as a separate automated and/or manual process after forming of the integral body.

At block 1350, the aid is made available for use. For example, the ambulation aid is made available for use, trial, sale, and so on. At block 1360, further user customization can be performed. For example, one or more add-ons, accessories, etc., such as a tray, seat, cover, cushion, graphic, grip, etc., can be selected and added/modified with respect to the ambulation aid. For example, further user customization can be performed after user purchase of the ambulation aid from a retailer, such as a store, and/or by a retailer/wholesaler prior to a sale to an end user.

Figure 14:
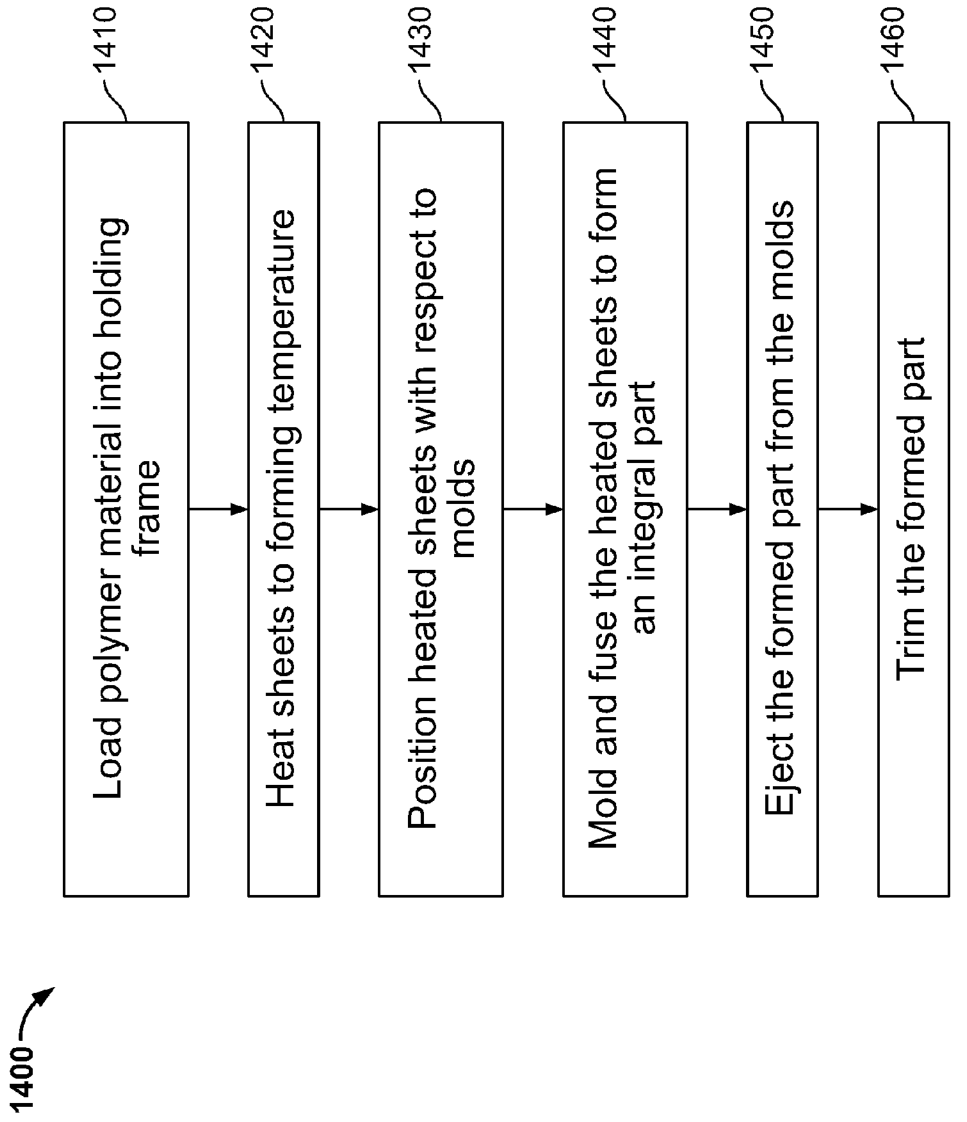
FIG. 14 illustrates a flow diagram of an example thermoforming process to manufacture an ambulation aid.

FIG. 14 illustrates a flow diagram of an example thermoforming process 1400 to manufacture an ambulation aid. Thermoforming is a manufacturing process in which a plastic sheet is heated to a pliable forming temperature, formed to a specific shape in a mold, and trimmed to create a usable product. The sheet, or "film", is heated to a high-enough temperature that it can be stretched into or onto a mold and cooled to a finished shape. In heavy gauge thermoforming, discrete sheets of material are typically fed into a machine for forming. In thin gauge thermoforming, a roll of material is typically provided.

Twin-sheet thermoforming can be performed using single station or multiple station thermoforming. There are two primary types of single station thermoforming, simultaneous forming and sequential forming. In simultaneous single station thermoforming, two polymer (or other material) sheets are formed simultaneously. In sequential single station thermoforming, the two sheets are formed sequentially. In multiple station thermoforming, the sheets are heated as well as formed sequentially before being forced together. Either of these processes can be used, but multiple station thermoforming provides advantages such as being able to utilize different thicknesses of the two sheets of materials, different types of materials, and better overall control of the process as each sheet is processed independently prior to fusing them together, for example. Using a single-station process, however, involves less expensive equipment and a simpler process of operation.

Both single and multiple station twin-sheet thermoforming include the same basic elements, as shown in the example of FIG. 14. At block 1410, two sheets of material (e.g., plastic or other polymer, etc.) are loaded into their respective holding frames. In single station thermoforming, the two sheets of material are loaded simultaneously into their respective holding frames. The holding frame(s) can include a one dual-sheet frame that holds both sheets for simultaneous type single station forming, or two individual frames for sequential type single station forming, for example. In multiple station thermoforming, the sheets are loaded sequentially into their respective holding frames.

At block 1420, sheets are heated to their forming temperature. In single station thermoforming, the two sheets of material are heated to forming temperature simultaneously in their respective holding frames. In multiple station thermoforming, the sheets are heated to forming temperature sequentially in their respective holding frame(s).

At block 1430, sheets are positioned with respect to their corresponding mold. For example, a first sheet is brought over a mold and a second sheet is brought under a mold. If the process is a single station simultaneous type process, the first and second sheets are positioned with respect to first and second molds simultaneously (including, as used herein, substantially simultaneous given some system and/or process delay). If the process is a single station sequential type process, the first and second sheets are positioned with respect to first and second molds sequentially. If the process is a multiple station process, the sheets are positioned with respect to first and second molds sequentially.

At block 1440, the heated sheets are formed to their respective molds and then forced together to fuse into an integral part. For example, in single station simultaneous thermoforming, vacuum is applied to both molds simultaneously to form the parts and then the two molds close together. In some examples, pressure may also be applied to the sealed chamber inside the part to help form the sheets.

In sequential type single station thermoforming process, a first heated sheet is formed to a bottom mold with vacuum and/or pressure. The first sheet is released from a thermoforming machine frame, and the bottom mold drops out of the way. Then, a second heated sheet shuttles or rotates under its respective mold. Vacuum and/or pressure is then applied to form the second sheet to the top mold. Subsequently, the frame holding the second sheet drops out of the way, and the two molds are forced together fusing the two sheets into one integral part.

In a multiple station process, each sheet is heated and formed sequentially. Subsequently, the two molds holding the two formed sheets are forced together, while the sheet material is still hot, to fuse the two parts together into an integral part. For example, a first sheet is loaded into a holding frame. Then, that first sheet is moved into a heating station. After the first sheet has moved into the heating station, a second sheet is loaded into a second holding frame. After the first sheet has heated sufficiently to forming temperature, the first sheet progresses to a forming station over or under its respective mold. At this point the second sheet now progresses to the heating station. The first sheet is formed to its respective mold via vacuum and/or pressure. At this point the second sheet progresses from the heating station over/under its respective mold. Then, the second sheet is formed to its respective mold via vacuum and/or pressure. At this stage, the two molds are forced together to fuse the two formed sheets into an integral part. The integral part is ejected from the molds and ready for potential trimming operations.

As discussed above, areas where the two sheets are forced into contact with each other are commonly referred to as “kiss-offs” and can provide much increased durability and structural integrity to the formed integral part. In kiss-off areas, one can typically observe witness marks in the plastic and/or other polymer sheet where the respective molds have applied pressure to fuse the heated material together. Hiding or disguising these witness marks within the design of the monocoque ambulation aid part can assist in alleviating their detraction from the overall finished appearance of the part. FIGS. 6*c* and 11, discussed above, provide examples utilizing features to disguise kiss-off witness marks.

Areas where the molds come together entirely and force all of the heated material out of a given area (“pinch-offs”) can result in the trimming of the formed integral part Areas where the two sheets just meet up but do not actually fuse together are commonly referred to as “near kiss-offs.” Near kiss-offs can also provide increased durability and structural integrity, but without leaving the witness mark observed with kiss-offs. Near kiss-offs can be implemented in forming an example ambulation aid in place of or in conjunction with the kiss-off features described above, for example.

At block 1450, the formed integral part is ejected from the molds and ready for trimming. At block 1460, the formed part can be trimmed. Trimming can be executed by hand manual knife operation, hand router, Computer Numerically Controlled (CNC) router, manual or automated die cutting, etc.

Figure 15:
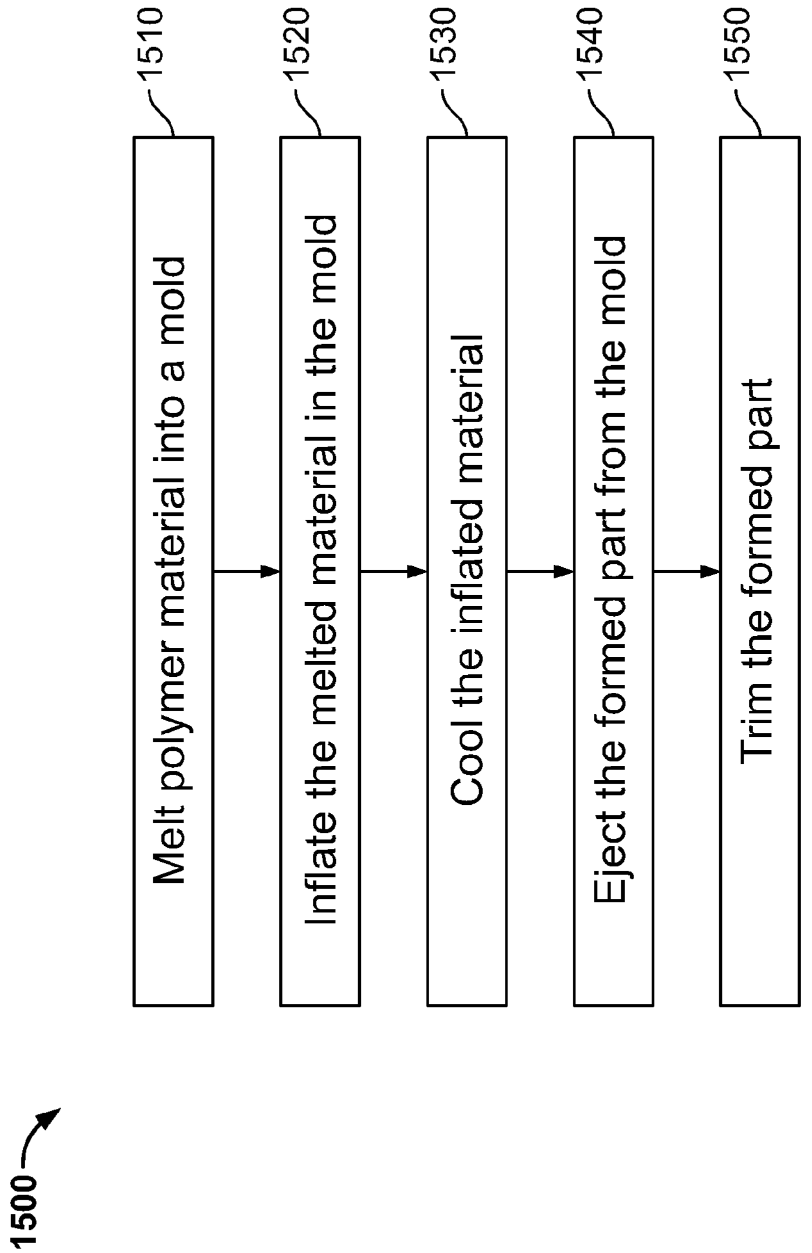
FIG. 15 illustrates a flow diagram of an example blow molding process to manufacture an ambulation aid.

FIG. 15 illustrates a flow diagram of an example blow molding process 1500 to manufacture an ambulation aid. Blow molding is a manufacturing process by which hollow plastic parts are formed.

At block 1510, polymer material is heated to melt the polymer material into a mold. In certain examples, the blow molding process begins with melting down plastic and forming the plastic into a parison or preform. The parison is a tube-like piece of plastic with a hole in one end through which compressed air can pass. The parison can be of a single material type, or the parison can be multiple layers to create a desired outside aesthetic, for example, or other varying property(-ies). The parison is then heated.

At block 1520, the heated material is inflated in the mold. For example, the heated parison is clamped into a mold, and air is pumped into the parison. The air pressure pushes out (e.g., inflates) the material (e.g., plastic or other polymer) to match the mold. At block 1530, the inflated material is cooled.

At block 1540, once the material has cooled and hardened the mold opens up and the formed part is ejected. At block 1550, the formed part may be trimmed, if necessary or desired.

In general, there are three main types of blow molding: extrusion blow molding, injection blow molding, and stretch blow molding. In extrusion blow molding (EBM), plastic is melted and extruded into a hollow tube (a parison). The parison is captured by closing the parison into a cooled metal mold. Air is then blown into the parison, inflating it into the shape of the hollow container or part. After the plastic has cooled sufficiently, the mold is opened and the part is ejected.

Extrusion blow molding can be continuous or intermittent. In continuous extrusion blow molding, the parison is extruded continuously, and individual parts are cut off with a suitable knife. In intermittent extrusion blow molding there are two processes: straight intermittent and accumulator. The straight intermittent method is similar to injection molding in which a screw turns, stops, and pushes the melt out. With the accumulator method, an accumulator gathers melted plastic, and, when the previous mold has cooled and enough plastic has accumulated, a rod pushes the melted plastic and forms the parison. In this case the screw may turn continuously or intermittently.

In injection blow molding (IBM) can be used for the production of hollow objects. In an IBM process, a polymer is injection molded onto a core pin; then the core pin is rotated to a blow molding station to be inflated and cooled. The IBM process is divided into three elements: injection, blowing and ejection.

An injection blow molding machine is based on an extruder barrel and screw assembly which melts the polymer. The molten polymer is fed into a hot runner manifold where it is injected through nozzles into a hollow, heated preform mold. The preform mold forms the external shape and is clamped around a mandrel (the core rod) which forms the internal shape of the preform. The preform includes a fully formed bottle/jar neck with a thick tube of polymer attached, which will form the body.

The preform mold opens and the core rod is rotated and clamped into the hollow, chilled blow mold. The core rod opens and allows compressed air into the preform, which inflates it to the finished article shape.

After a cooling period the blow mold opens and the core rod is rotated to the ejection position. The finished article is stripped off the core rod and leak-tested prior to packing. The preform and blow mold can have many cavities, typically three to sixteen depending on the article size and the required output. There are three sets of core rods, which allow concurrent preform injection, blow molding and ejection, for example.

In a stretch blow molding (SBM) process, the polymer is first molded into a "preform" using the injection molding process. The preforms are packaged, and fed (after cooling) into a reheat stretch blow molding machine. In the SBM process, the preforms are heated (e.g., using infrared heaters) above a transition temperature, and then blown using high pressure air into an integral part (e.g., an integral ambulation aid body part) using metal blow molds. The stretching of some polymers, such as PET (polyethylene terephthalate) results in strain hardening of the resin, allowing the formed parts to resist deforming under the pressure.

Figure 16:
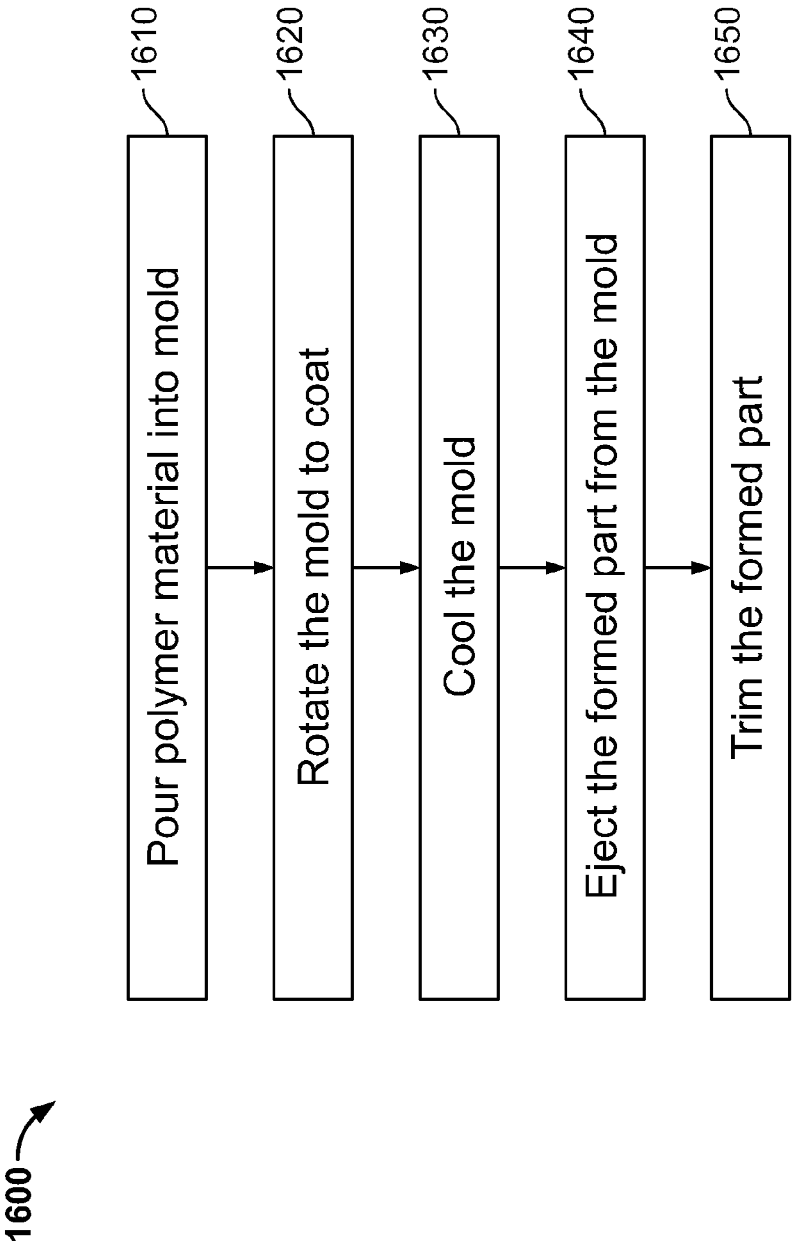
FIG. 16 illustrates a flow diagram of an example rotational molding process to manufacture an ambulation aid.

FIG. 16 illustrates a flow diagram of an example rotational molding process 1600 to manufacture an ambulation aid. Rotational molding (also referred to as rotomolding) involves a hollow mold which, at block 1610, is filled with a charge or shot weight of material. At block 1620, the mold is then slowly rotated (e.g., around two perpendicular axes) causing the softened material to disperse and stick to the walls of the mold. For example, the mold is rotated to tumble/spin the material around to evenly coat the mold.

At block 1630, the mold is cooled. For example, the polymer is to be cooled so that it solidifies and can be handled safely. The part shrinks on cooling, coming away from the mold and facilitating easy removal of the part. The cooling rate must be kept within a certain range. Rapid cooling (for example, water spray) may result in cooling and shrinking at an uncontrolled rate, producing a warped part. In order to maintain even thickness throughout the part, the mold continues to rotate at all times during a heating phase and, to avoid sagging or deformation, also rotates during a cooling phase. At block 1640, the part is removed from the mold. At block 1650, the formed part may be trimmed if needed or desired.

In certain examples, a gas assist molding process can be used to manufacture an example ambulation aid and/or component thereof. An example gas assist molding process includes injecting a fixed, short volume of polymer melt into a vented mold cavity (e.g., a "short shot"). Gas channels act as internal runners along the part to fill from a single gate into the mold, thereby eliminating weld lines in the resulting part associated with multiple gates. After polymer injection (or after a short delay), compressed gas (e.g., nitrogen and/or other relatively inert gas) is injected into the mold cavity through a central core of the melt. The gas pressure acts on the fluid melt core, completing the mold filling process. The gas takes a path of least resistance, penetrating and hollowing (e.g., coring out) a network of predesigned thick flow leader sections (e.g., gas channels), displacing molten polymer at the core, and filling out the mold cavity (e.g., primary gas penetration). Packing is not accomplished by an injection ram/cushion, but rather by the gas pressure itself. After mold filling, the gas pressure is maintained in order to pack the part and compensate for volumetric shrinkage (e.g., secondary gas penetration). After the part has cooled to a point at which the part is rigid enough to eject, the gas is vented off through a pin or by sprue breakaway (and sometimes recycled) prior to mold opening and part ejection, for example.

In operation, an elderly, ill, injured, or impaired individual uses an ambulation aid to assist that user in moving around, standing, supporting themselves, rehabilitation, etc. The user grasps the handles of the device to help him or her walk forward, turn, etc. The user may utilize a seat in the ambulation aid to sit down and rest. The user may also utilize the tray and/or seat to hold items, eat, etc. The user may rest or store other items such as in a storage compartment, cup holder, hook, notch, etc. In certain examples, using freedom of movement in front wheels and exposure in rear wheels, the user is able to navigate hallways, streets, sidewalks, etc., including stairs, curbs, etc., using the provided stability of the ambulation aid without increasing his or her risk of falling and/or otherwise getting hurt, etc. Upon reaching a destination, the user may choose to fold the ambulation aid and put it aside temporarily or for a longer duration. Based on the design, weighting, and arrangement of the ambulation aid, the aid is self-supporting and can remain standing upright after being folded.

Example Ornamental Designs

Figure 17:
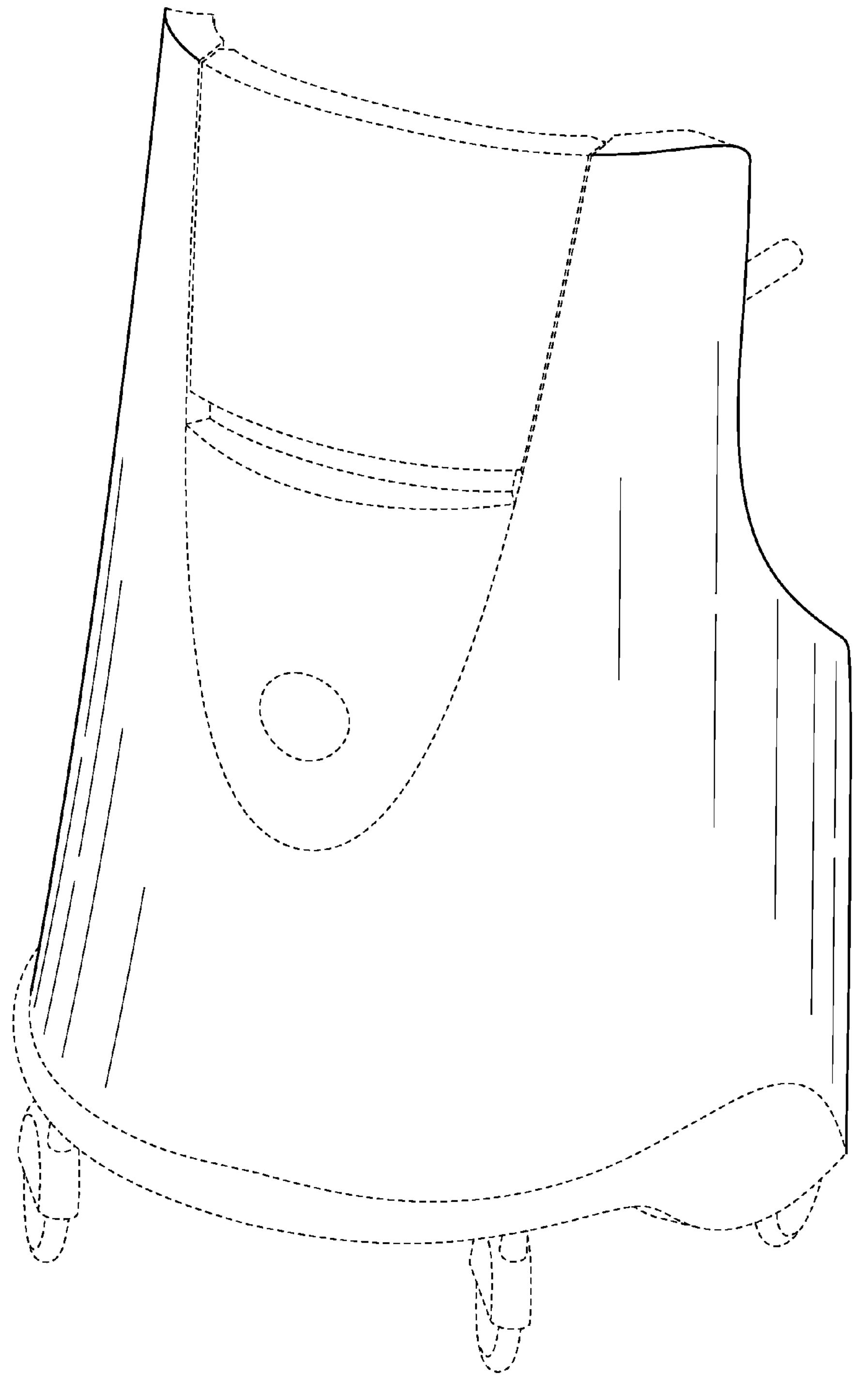
FIGS. 17-34 illustrate a plurality of views of an ornamental appearance of an example ambulation aid.
Figure 18:
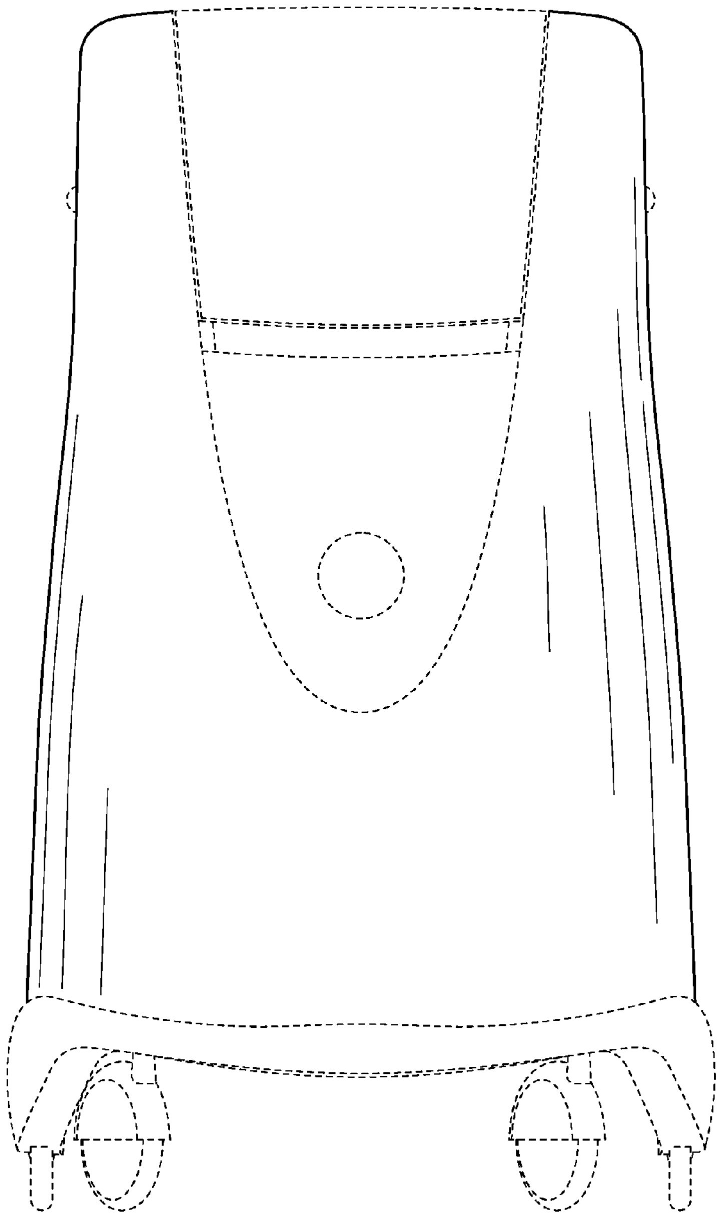
Figure 19:
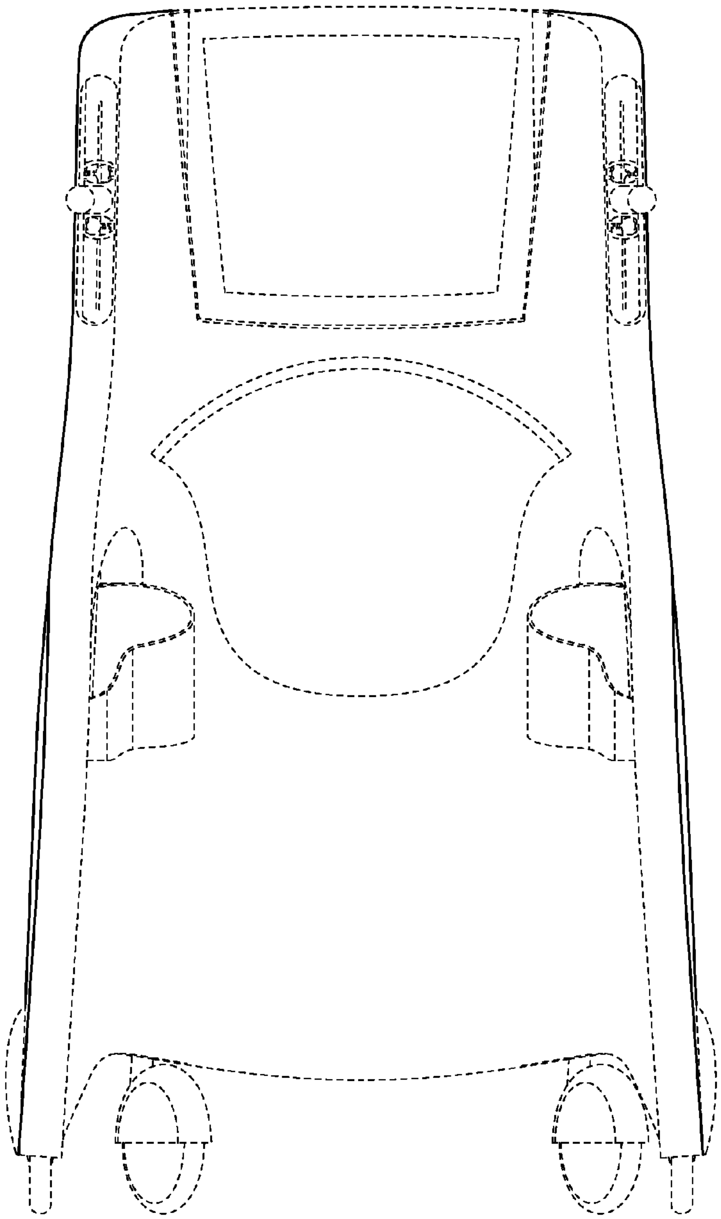
Figure 20:
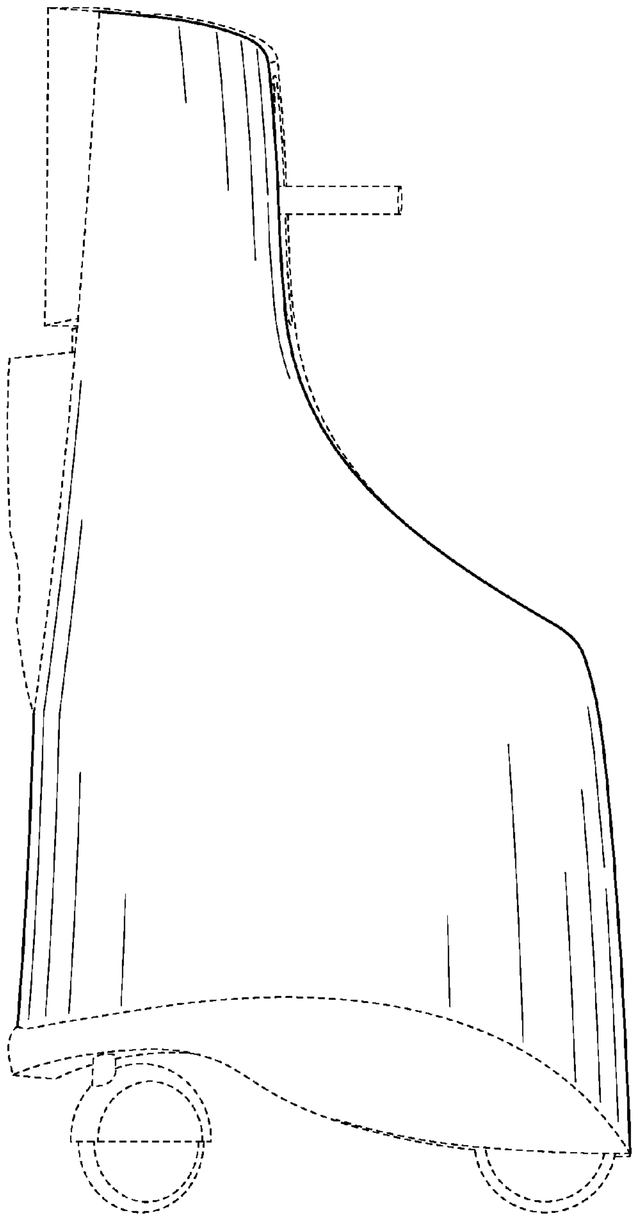
Figure 21:
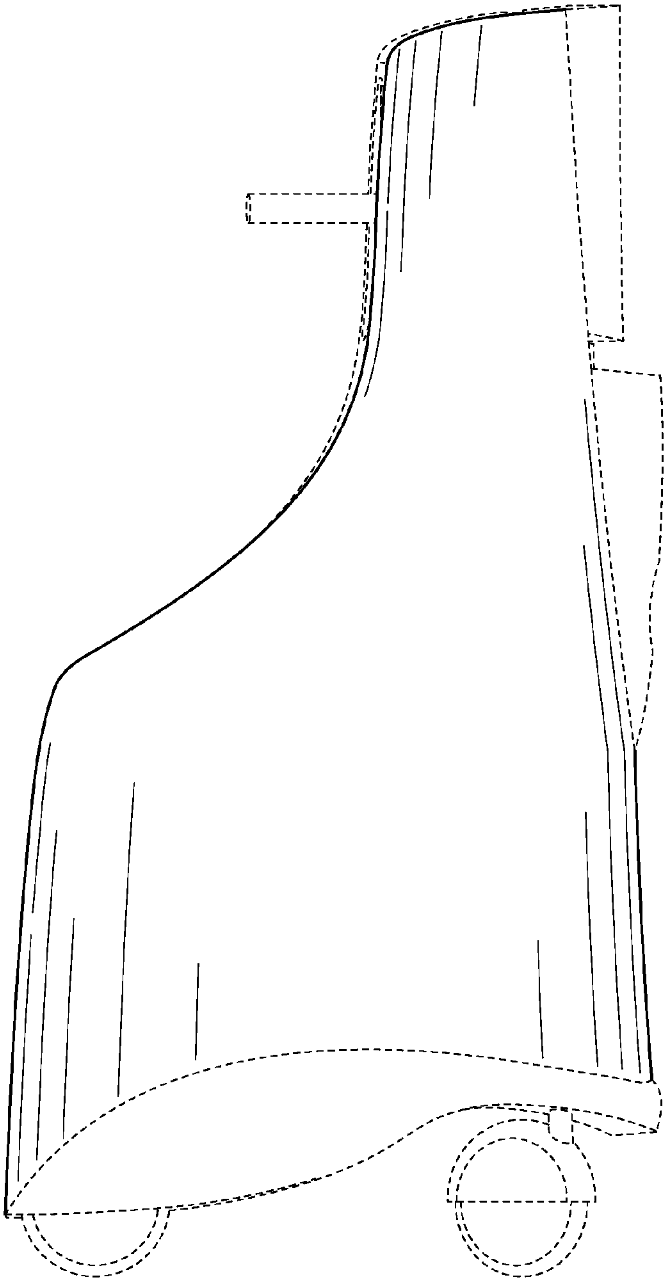
Figure 22:
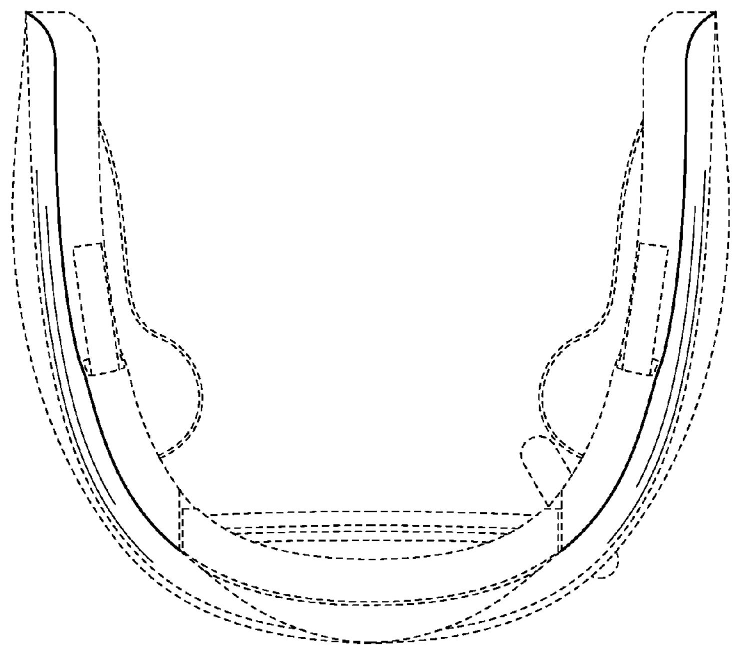
Figure 23:
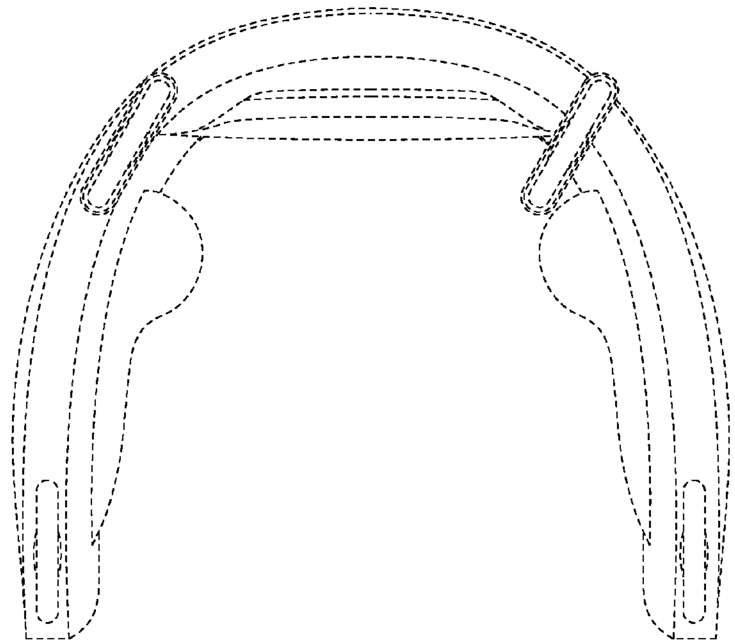
Figure 24:
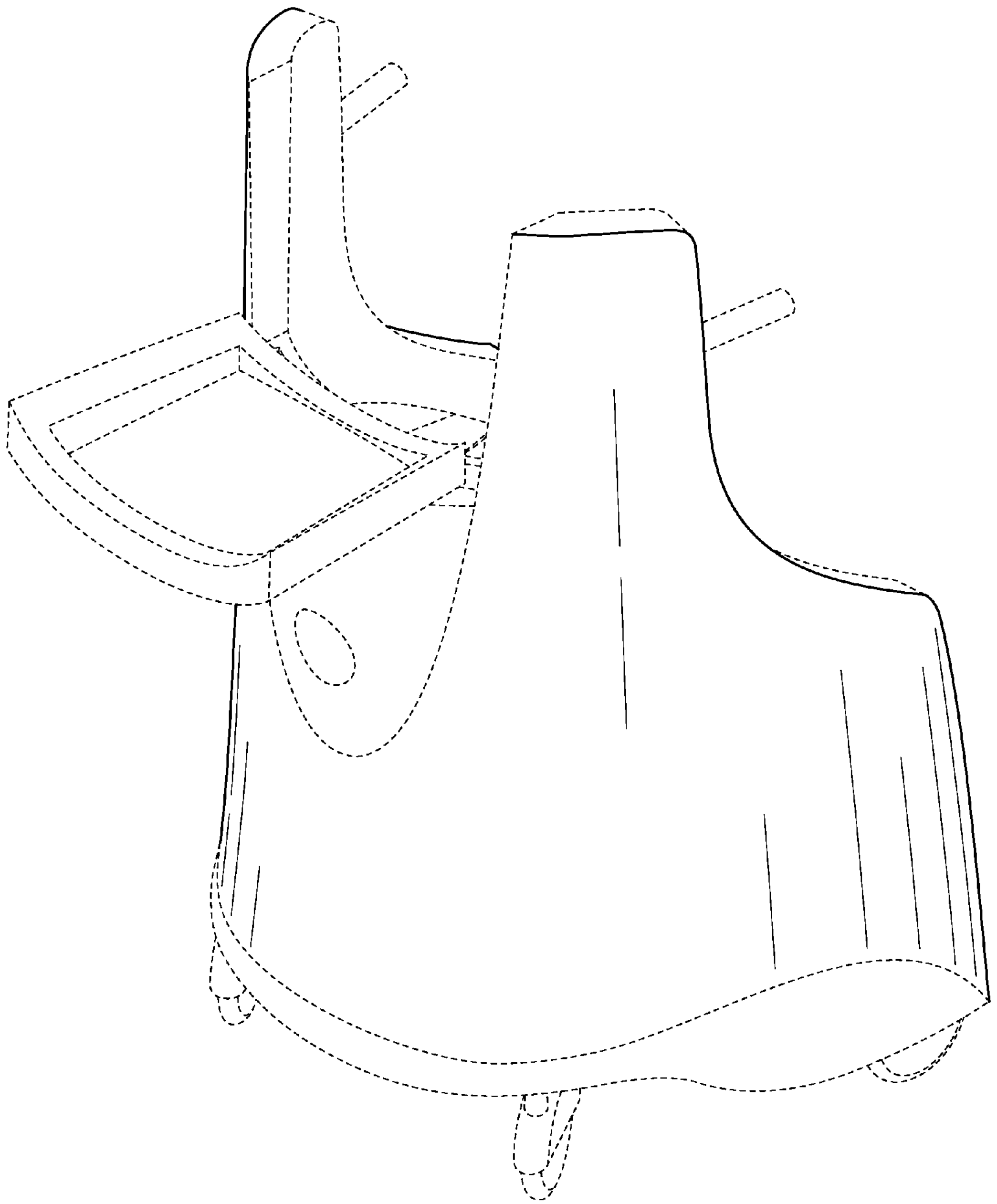
Figure 25:
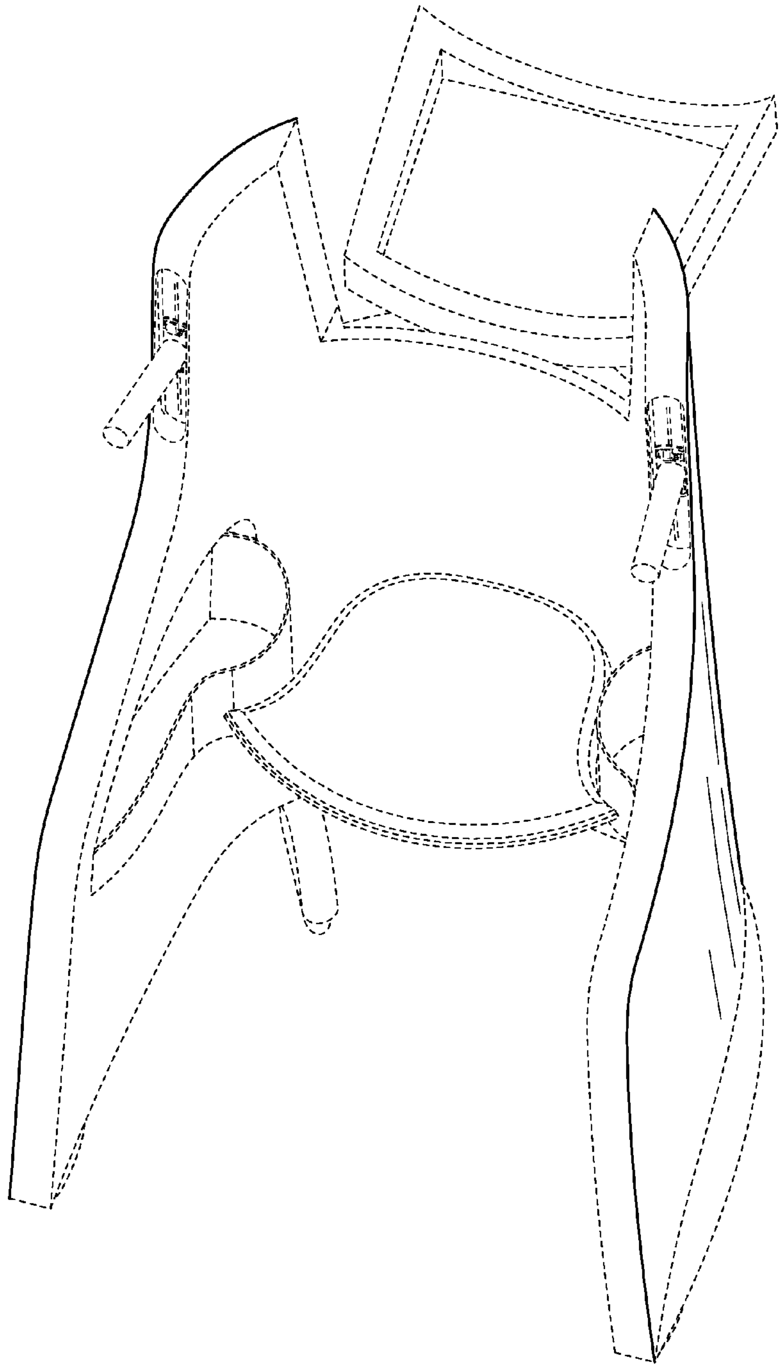
Figure 26:
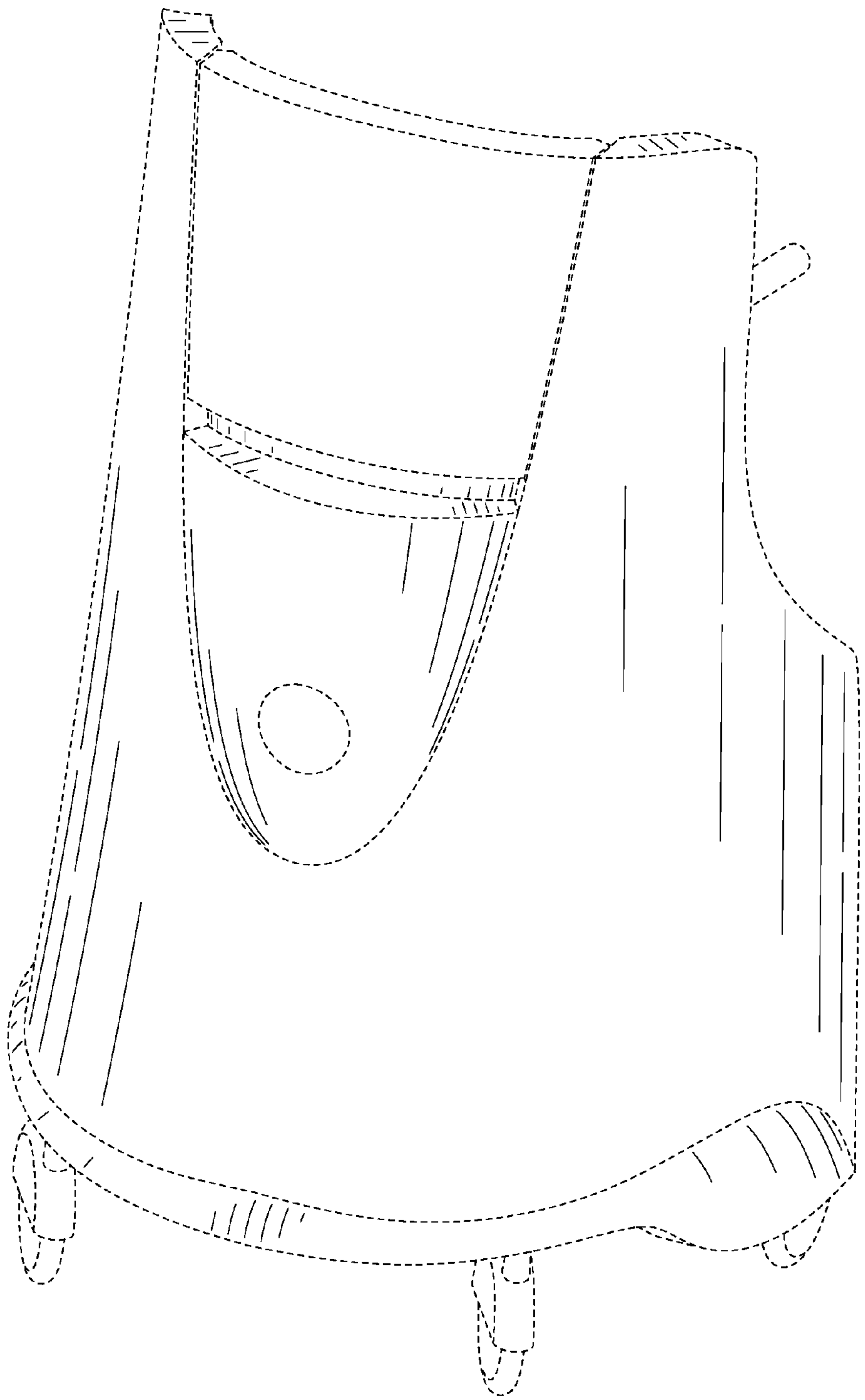
Figure 27:
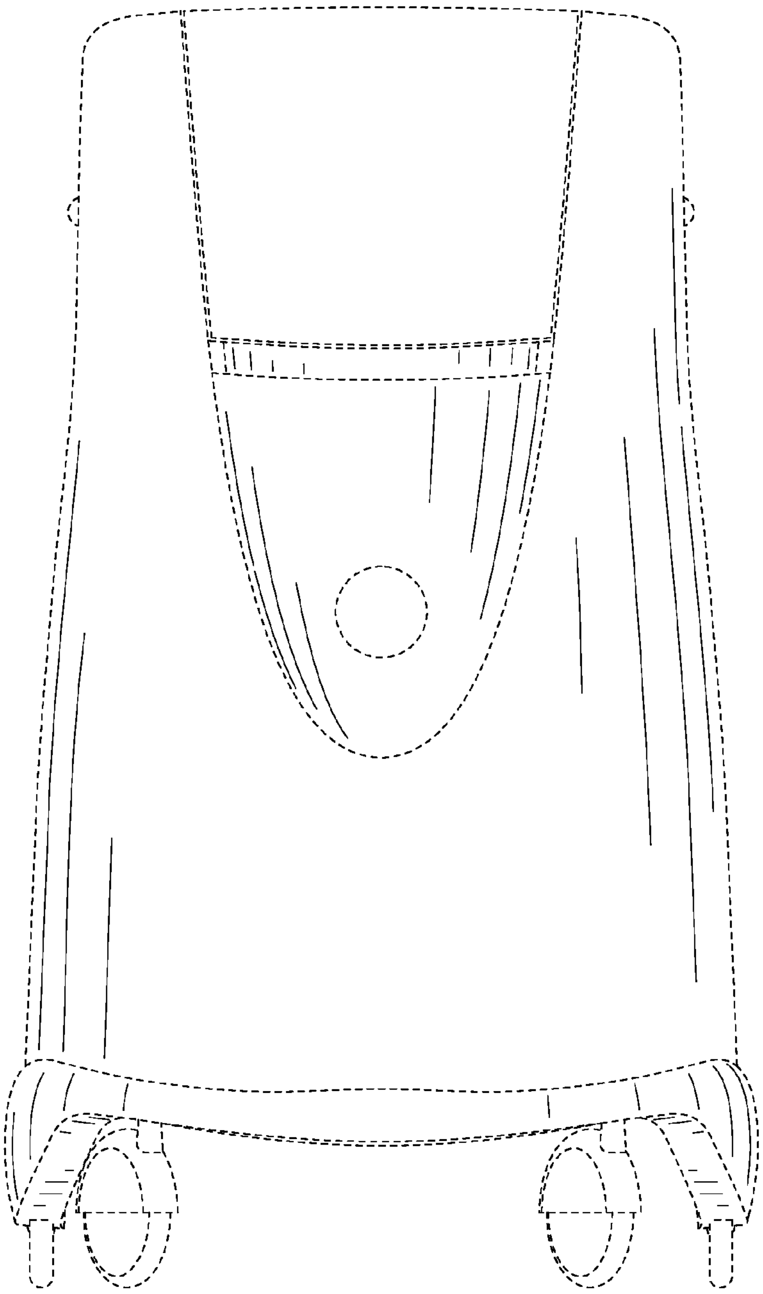
Figure 28:
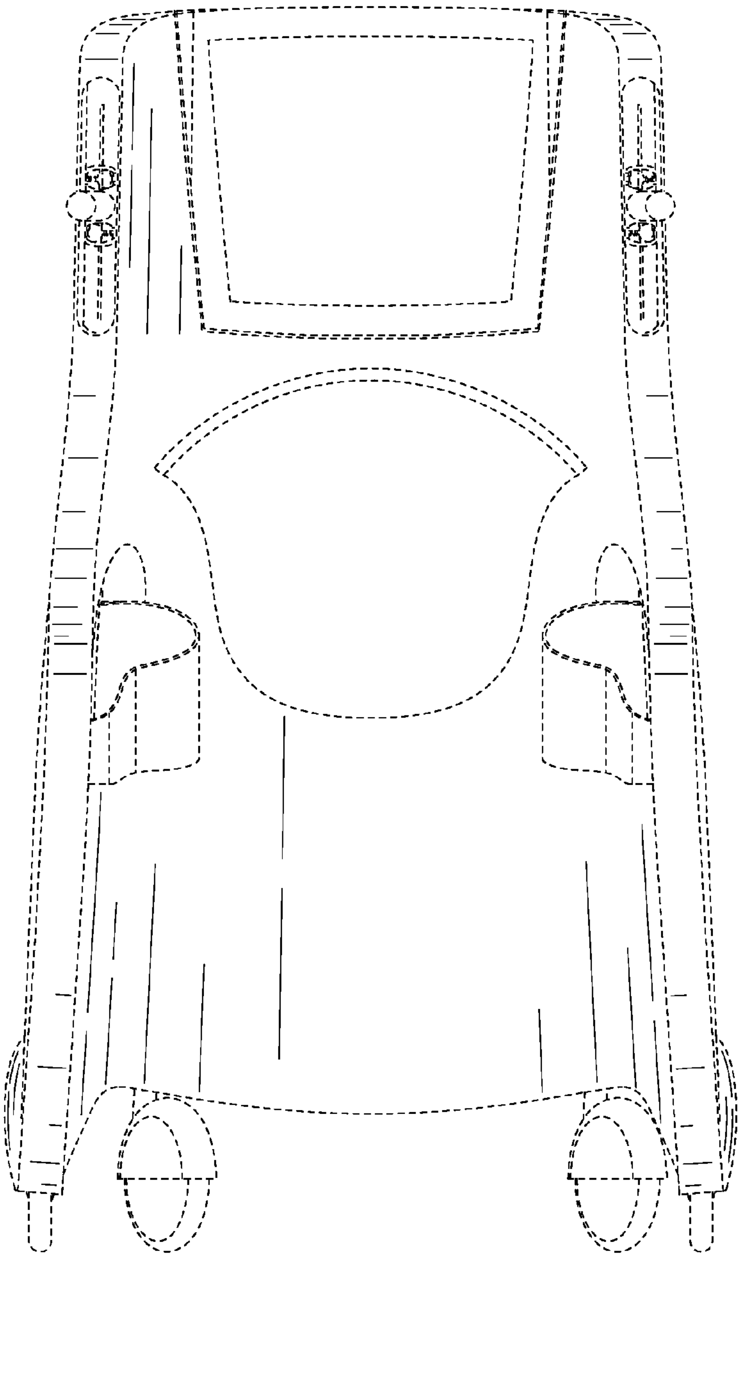
Figure 29:
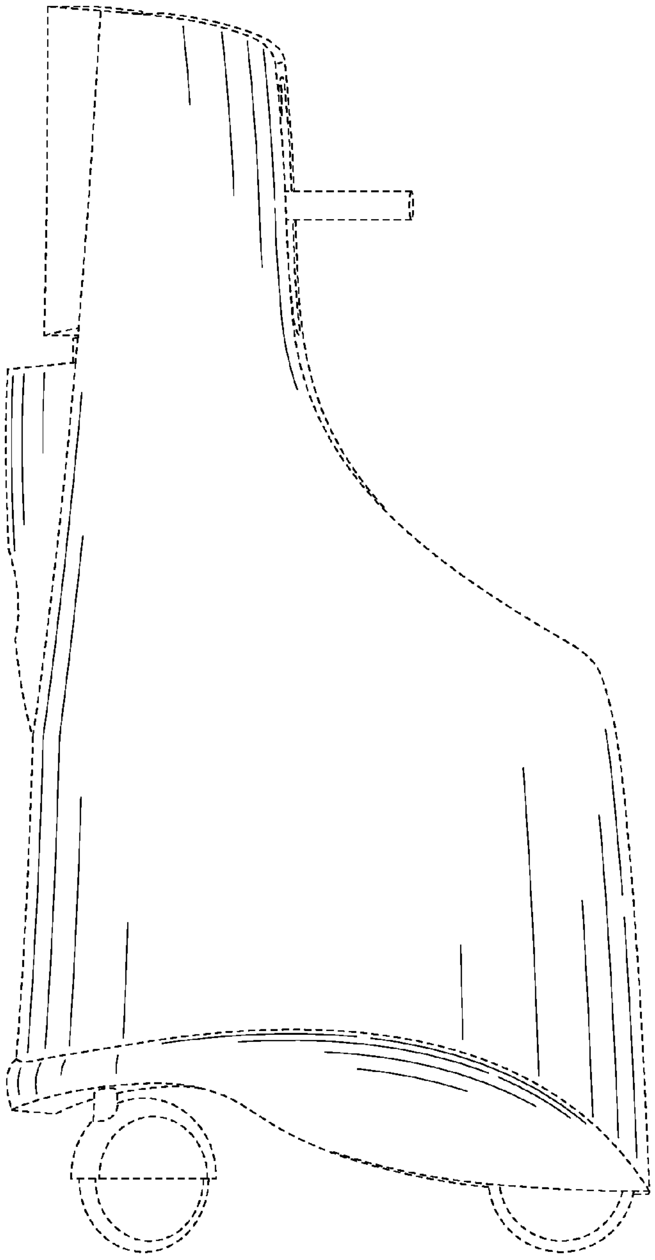
Figure 30:
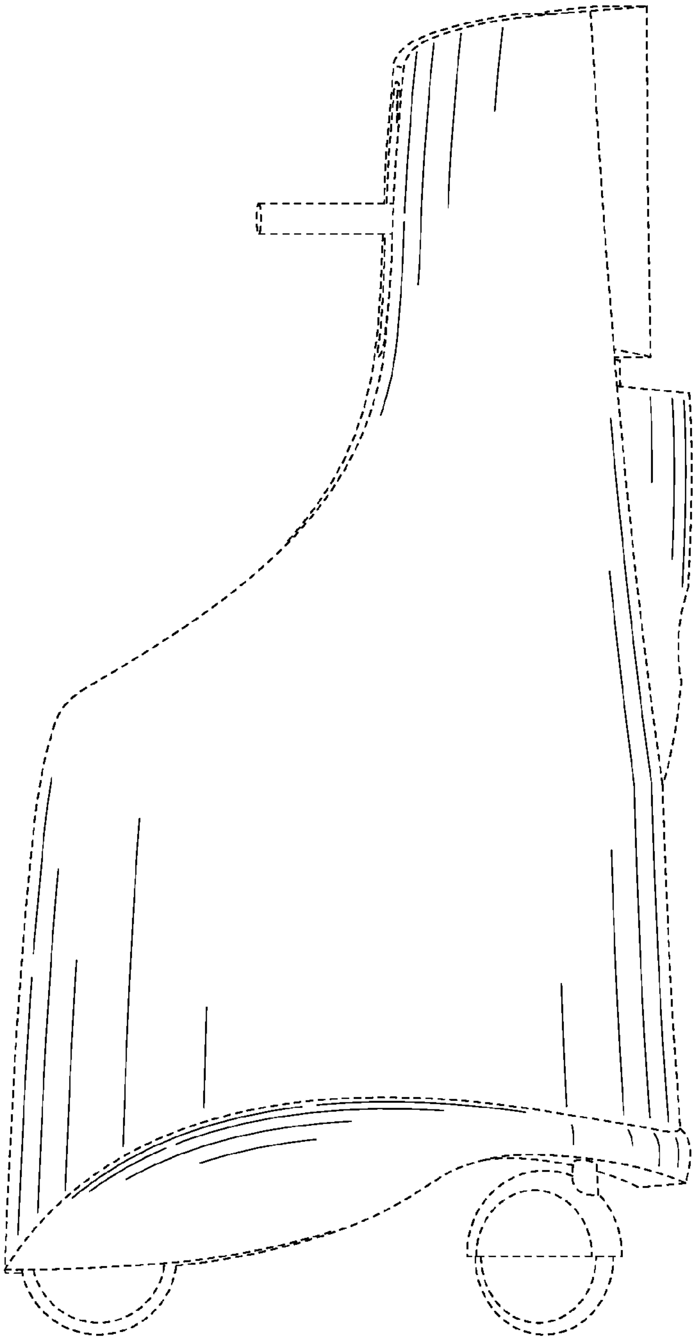
Figure 31:
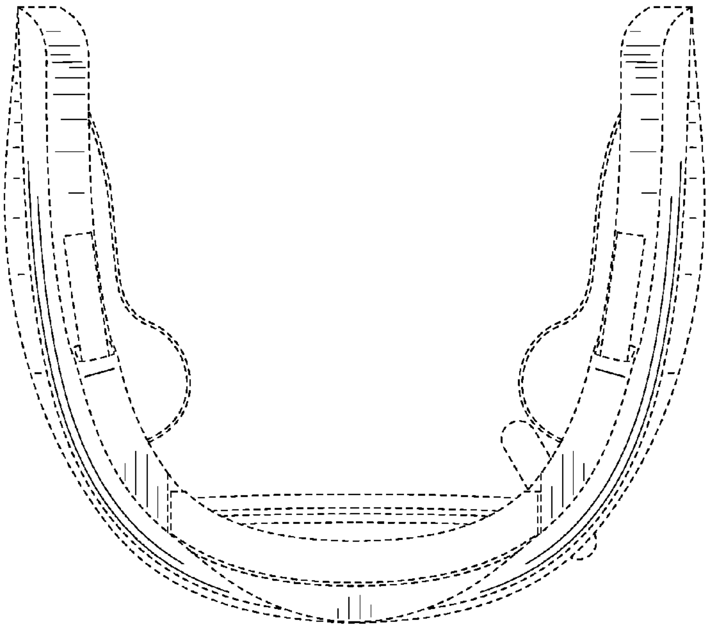
Figure 32:
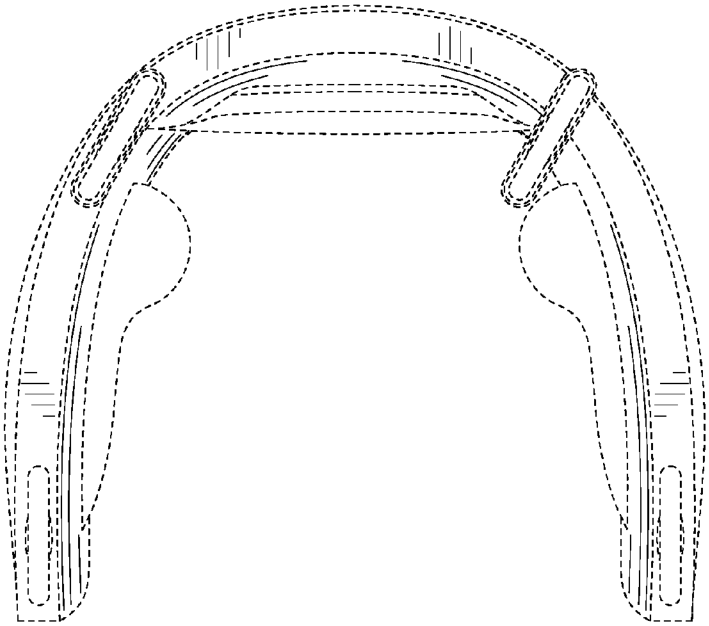
Figure 33:
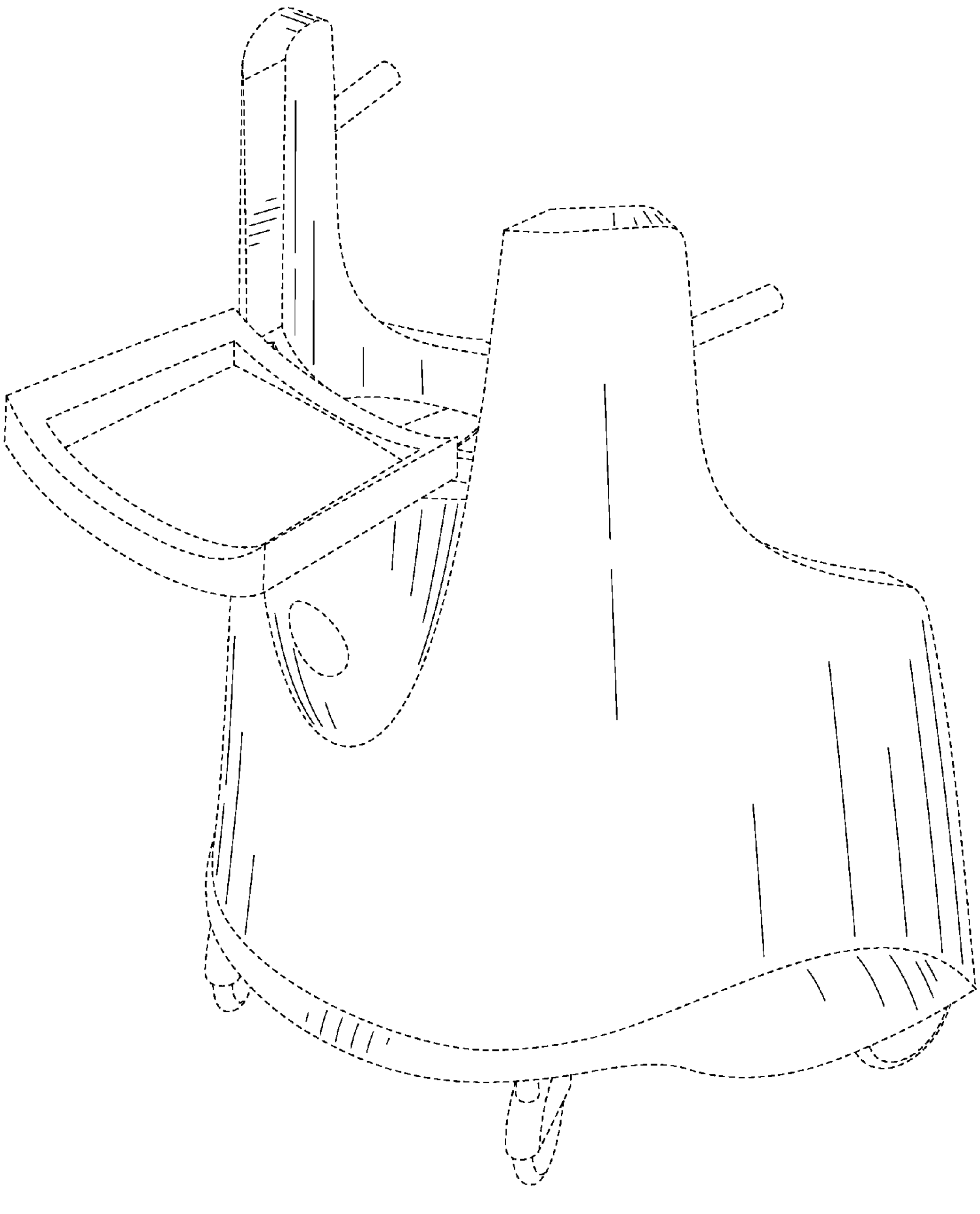
Figure 34:
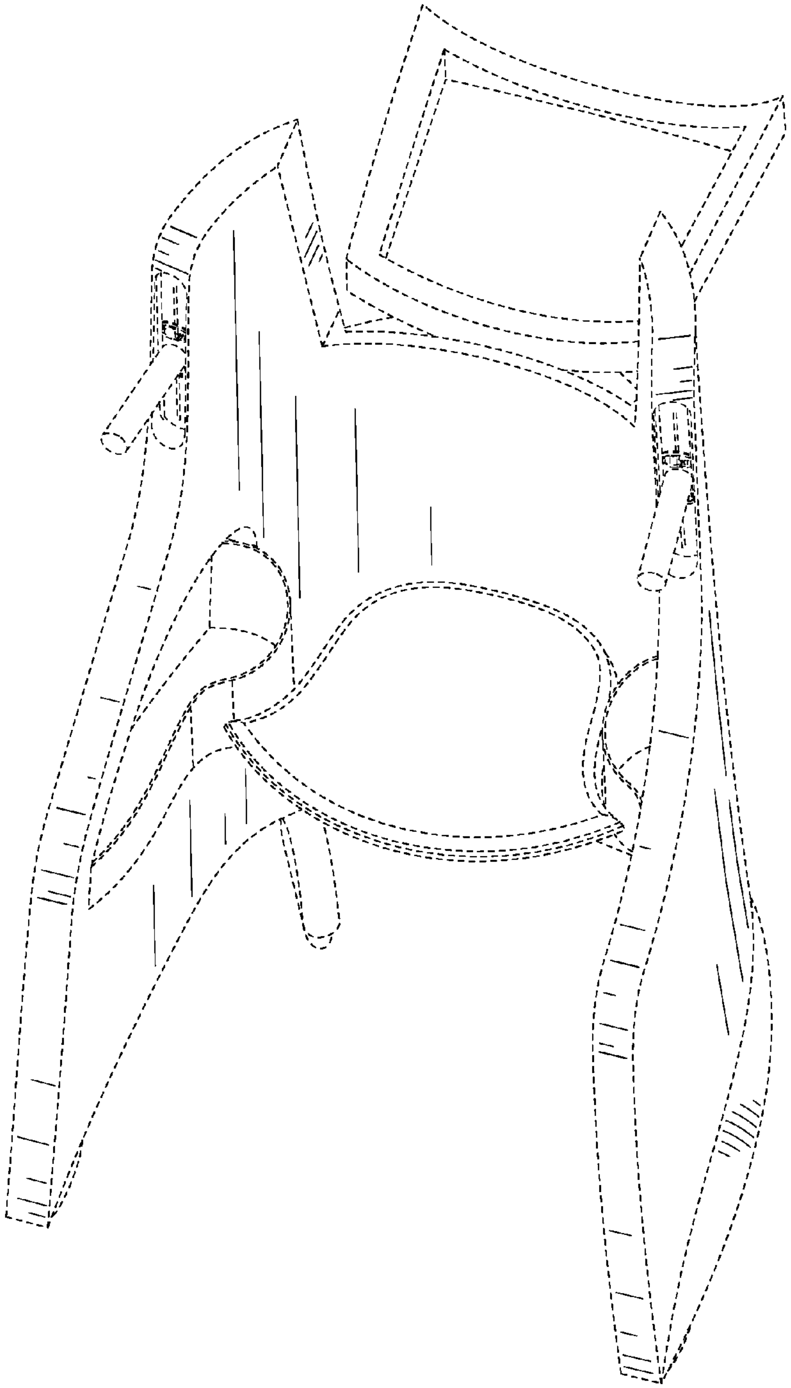

FIGS. 17-34 illustrate a plurality of views of an ornamental appearance of an example ambulation aid. FIG. 17 is an isometric view of an ambulation aid. FIG. 18 is a front view of the ambulation aid. FIG. 19 is a rear view of the ambulation aid. FIG. 20 is a first side view of the ambulation aid. FIG. 21 is a second side view of the ambulation aid. FIG. 22 is a top view of the ambulation aid. FIG. 23 is a bottom view of the ambulation aid. FIG. 24 is an isometric view of the ambulation aid. FIG. 25 is a rear isometric view of the ambulation aid. FIGS. 26-34 are duplicates of FIGS. 17-25, but include all portions in broken lines.

Modifications and variations as would be apparent to a skilled addressee are determined to be within the scope of the present invention.

It is to be understood that, if any prior art is referred to herein, such reference does not constitute an admission that the prior art forms a part of the common general knowledge of the art in any country.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The invention claimed is:

1. An apparatus comprising:

a non-tubular ambulation aid body formed as an integral part, the integral part including a primary panel formed in monocoque construction to provide support for mobility of a user through a skin of the primary panel, the primary panel formed to interrelate with one or more subassemblies to provide the integral part, the integral part providing a plurality of grippable areas to facilitate user movement and support through the integral part.

2. The apparatus of claim 1, wherein the ambulation aid body is to be formed as an integral part via a thermoforming process.

3. The apparatus of claim 1, wherein the ambulation aid body comprises a reinforced, hollow integral part.

4. The apparatus of claim 1, wherein the ambulation aid body is to be formed from a polymer material.

5. The apparatus of claim 1, further comprising a seat to support a user when in use and to allow the user to walk inside a boundary of the ambulation aid body for support and movement via the ambulation aid body at least when the seat is not in use.

6. The apparatus of claim 1, further comprising a tray to support an item when in use and to allow the user to walk inside a boundary of the ambulation aid body for support and movement via the ambulation aid body at least when the tray is not in use.

7. The apparatus of claim 1, wherein the plurality of grippable areas comprise one or more of a handle, an opening, a top of the ambulation aid body, a side of the ambulation aid body.

8. The apparatus of claim 7, wherein the handle is at least one of movably affixed to and incorporated into the ambulation aid body.

9. The apparatus of claim 8, wherein the handle is to be movable with respect to the ambulation aid body to adjust a height of the ambulation aid body with respect to the user.

10. The apparatus of claim 1, further comprising at least one of a wheel and a skid affixed to the ambulation aid body to facilitate movement of the ambulation aid body by the user.

11. The apparatus of claim 1, wherein the ambulation aid body comprises one or more connections between sections of the monocoque constructed integral body to enable the ambulation aid body to be folded, and wherein, when folded, the ambulation aid body is to remain self-standing and movable.

12. The apparatus of claim 11, wherein the ambulation aid body further comprises storage, wherein the storage is to retain an item placed in the storage when the ambulation aid body is folded.

13. A method of forming a monocoque ambulation aid, the method comprising:

forming, from a supply of moldable material, a non-tubular ambulation aid body as an integral part in monocoque construction, the integral part including a primary panel formed in monocoque construction to provide support for mobility of a user through a skin of the primary panel, the primary panel formed to interrelate with one or more subassemblies to provide the integral part, the integral part providing a plurality of grippable areas to facilitate user movement and support through the integral part.

14. The method of claim 13, wherein forming comprises forming, from a supply of moldable material using a thermoforming process, an ambulation aid body.

15. The method of claim 14, wherein the thermoforming process comprises a twin sheet thermoforming process.

16. The method of claim 13, wherein forming comprises forming, from a supply of moldable material using a blow molding process, an ambulation aid body.

17. The method of claim 13, wherein forming further comprises reinforcing the ambulation aid body to produce a reinforced, hollow integral part.

18. The method of claim 13, wherein the supply of moldable material comprises a polymer-based material.

19. The method of claim 13, further comprising attaching one or more subassemblies to the formed ambulation aid body.

20. The method of claim 19, wherein the one or more subassemblies include a seat to support a user when in use and to allow the user to walk inside a boundary of the ambulation aid body for support and movement via the ambulation aid body at least when the seat is not in use.

21. The method of claim 19, wherein the one or more subassemblies include a tray to support an item when in use and to allow the user to walk inside a boundary of the ambulation aid body for support and movement via the ambulation aid body at least when the tray is not in use.

22. The method of claim 19, wherein the one or more subassemblies include at least one of wheels and a skid affixed to the ambulation aid body to facilitate movement of the ambulation aid body by the user.

23. The method of claim 19, wherein the one or more subassemblies include storage, wherein the storage is to retain an item placed in the storage when the ambulation aid body is folded.

24. The method of claim 13, wherein the plurality of grippable areas comprise one or more of a handle, an opening, a top of the ambulation aid body, a side of the ambulation aid body.

25. The method of claim 24, wherein the handle is at least one of movably affixed to and incorporated into the ambulation aid body.

26. The method of claim 25, wherein the handle is to be movable with respect to the ambulation aid body to adjust a height of the ambulation aid body with respect to the user.

27. The method of claim 13, wherein the ambulation aid body comprises one or more connectors to enable the ambulation aid body to be folded, and wherein, when folded, the ambulation aid body is to remain self-standing and movable.

28. An ambulation aid apparatus comprising:

a non-tubular primary panel formed in monocoque construction to provide support for and assist in mobility of a user through the skin of the monocoque primary panel, the primary panel formed to interrelate with one or more subassemblies to provide an integrated monocoque part to assist in providing support for and improved mobility of the user through the integrated monocoque part.

29. The apparatus of claim 28, wherein the one or more subassemblies comprises a plurality of secondary monocoque panels, the plurality of secondary panels movably connected to the primary panel to form a body of the ambulatory aid and arranged to provide support and mobility to a user when the secondary panels are extended in relation to the primary panel.

30. The apparatus of claim 29, wherein connections between the primary panel and the plurality of secondary panels enable the ambulation aid apparatus to be folded, and wherein, when folded, the ambulation aid apparatus is to remain self-standing and movable.

31. The apparatus of claim 29, wherein the one or more subassemblies include storage, wherein the storage is to retain an item placed in the storage when the ambulation aid apparatus is folded.

32. The apparatus of claim 28, wherein the primary panel is to be formed via a thermoforming process.

33. The apparatus of claim 28, wherein the primary panel comprises a reinforced, hollow monocoque part.

34. The apparatus of claim 28, wherein the one or more subassemblies include a seat, wherein the user is able to walk inside a boundary of the ambulation aid apparatus for support and movement via the ambulation aid apparatus at least when the seat is not in use.

35. The apparatus of claim 28, wherein the one or more subassemblies include a tray, wherein the user is able to walk inside a boundary of the ambulation aid apparatus for support and movement via the ambulation aid apparatus at least when the tray is not in use.

36. The apparatus of claim 28, wherein the one or more subassemblies include one or more grippable areas comprising one or more of a handle and an opening with respect to the ambulation aid apparatus.

37. The apparatus of claim 28, wherein the one or more subassemblies include at least one of a wheel and a skid affixed to the ambulation aid apparatus to facilitate movement of the ambulation aid apparatus by the user.

* * * * *